United States Patent
Lee et al.

(10) Patent No.: US 12,470,237 B2
(45) Date of Patent: Nov. 11, 2025

(54) METHOD AND APPARATUS FOR TRANSMITTING NON-LINEAR STATE INFORMATION FOR COMPENSATING NONLINEARITY OF TRANSMITTER IN WIRELESS COMMUNICATION SYSTEM

(71) Applicant: Samsung Electronics Co., Ltd., Suwon-si (KR)

(72) Inventors: Sangho Lee, Suwon-si (KR); Suhwook Kim, Suwon-si (KR); Seungil Park, Suwon-si (KR); Yosub Park, Suwon-si (KR); Bongsung Seo, Suwon-si (KR); Hyeondeok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 18/156,789

(22) Filed: Jan. 19, 2023

(65) Prior Publication Data
US 2023/0268943 A1   Aug. 24, 2023

(30) Foreign Application Priority Data

Jan. 20, 2022   (KR) ........................ 10-2022-0008729

(51) Int. Cl.
*H04B 1/04* (2006.01)

(52) U.S. Cl.
CPC ... *H04B 1/0475* (2013.01); *H04B 2001/0441* (2013.01)

(58) Field of Classification Search
CPC ...................... H04B 1/0475; H04B 2001/0441
See application file for complete search history.

(56) References Cited

U.S. PATENT DOCUMENTS

| | | | |
|---|---|---|---|
| 7,746,169 B2 | 6/2010 | Deng et al. | |
| 9,595,986 B2 | 3/2017 | Dunsmore | |
| 2007/0030076 A1 | 2/2007 | Kim et al. | |
| 2015/0049843 A1 | 2/2015 | Reuven et al. | |
| 2019/0181923 A1* | 6/2019 | Nammi | H04B 17/30 |
| 2019/0215023 A1 | 7/2019 | Abouelenin | |
| 2020/0083934 A1 | 3/2020 | Nammi | |

(Continued)

FOREIGN PATENT DOCUMENTS

| | | |
|---|---|---|
| JP | 2019-016994 A | 1/2019 |
| KR | 10-2008-0031999 A | 4/2008 |

OTHER PUBLICATIONS

Extended European Search Report dated Feb. 12, 2025, issued in a European Application No. 23743485.7.

(Continued)

*Primary Examiner* — Junpeng Chen
(74) *Attorney, Agent, or Firm* — Jefferson IP Law, LLP

(57) ABSTRACT

The present disclosure relates to a 5G communication system or a 6G communication system for supporting higher data rates beyond a 4G communication system such as long term evolution (LTE). A method performed by a first entity transmitting data in a wireless communication system is provided. The method includes detecting a nonlinearity of a transmission power of a signal transmitted from the first entity is changed, transmitting, to a second entity, a nonlinearity state indicator corresponding to the changed nonlinearity, and transmitting, to the second entity, data according to the nonlinearity state indicator.

20 Claims, 31 Drawing Sheets

(56) References Cited

U.S. PATENT DOCUMENTS

| | | |
|---|---|---|
| 2020/0169334 A1 | 5/2020 | Li et al. |
| 2020/0321992 A1 | 10/2020 | Sagi et al. |
| 2021/0119682 A1 | 4/2021 | Gutman et al. |
| 2021/0367686 A1 | 11/2021 | Gutman et al. |
| 2022/0385515 A1* | 12/2022 | Kutz .................. H04L 27/2623 |
| 2022/0393734 A1* | 12/2022 | Laufer ................ H04B 17/382 |
| 2022/0407627 A1* | 12/2022 | Horn ................. H04W 72/1268 |

OTHER PUBLICATIONS

International Search Report dated Apr. 25, 2023, issued in International Patent Application No. PCT/KR2023/000932.

\* cited by examiner

METHOD AND APPARATUS FOR TRANSMITTING NON-LINEAR STATE INFORMATION FOR COMPENSATING NONLINEARITY OF TRANSMITTER IN WIRELESS COMMUNICATION SYSTEM

CROSS-REFERENCE TO RELATED APPLICATION(S)

This application is based on and claims priority under 35 U.S.C. § 119 (a) of a Korean patent application number 10-2022-0008729, filed on Jan. 20, 2022, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for efficient data transmission between a base station and a terminal in a 6th generation mobile communication (6G) system.

2. Description of Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

The above information is presented as background information only to assist with an understanding of the disclosure. No determination has been made, and no assertion is made, as to whether any of the above might be applicable as prior art with regard to the disclosure.

SUMMARY

In a 6G system, high data rates must be supported in wider coverage, and smooth cooperation between a terminal and a base station must be performed. In a general network environment, because there are multiple terminals and multiple base stations, signals may interfere with each other.

Aspects of the disclosure are to address at least the above-mentioned problems and/or disadvantages and to provide at least the advantages described below. Accordingly, an aspect of the disclosure is to provide a method and apparatus for more efficiently compensating nonlinearity of a transmitter when a terminal and a base station perform transmission and reception operations in the 6G system.

Additional aspects will be set forth in part in the description which follows and, in part, will be apparent from the description, or may be learned by practice of the presented embodiments.

In accordance with an aspect of the disclosure, a method performed by a first entity transmitting data in a wireless communication system is provided. The method includes detecting a nonlinearity of a transmission power of a signal transmitted from the first entity is changed, transmitting, to a second entity, a nonlinearity state indicator corresponding to the changed nonlinearity, and transmitting, to the second entity, data according to the nonlinearity state indicator.

In accordance with another aspect of the disclosure, a method performed by a second entity receiving data in a wireless communication system is provided. The method includes receiving, from a first entity, a nonlinearity state indicator, identifying a nonlinearity compensation model for compensating a nonlinearity of a transmission power of a signal transmitted from the first entity based on the nonlinearity state indicator, and receiving, from the first entity, data based on the nonlinearity compensation model corresponding to the nonlinearity state indicator.

In accordance with another aspect of the disclosure, a first entity transmitting data in a wireless communication system is provided. The first entity includes a transceiver and a controller. The controller is configured to detect a nonlinearity of a transmission power of a signal transmitted from the first entity is changed, transmit, to a second entity via the transceiver, a nonlinearity state indicator corresponding to the changed nonlinearity, and transmit, to the second entity via the transceiver, data according to the nonlinearity state indicator.

In accordance with another aspect of the disclosure, a second entity receiving data in a wireless communication system is provided. The second entity includes a transceiver and a controller. The controller is configured to receive, from a first entity via the transceiver, a nonlinearity state indicator, identify a nonlinearity compensation model for compensating a nonlinearity of a transmission power of a signal transmitted from the first entity based on the nonlinearity state indicator, and receive, from the first entity via the transceiver, data based on the nonlinearity compensation model corresponding to the nonlinearity state indicator.

According to an embodiment of the disclosure, when the transmitter and the receiver use the nonlinearity compensation model, because the transmitter may transmit a signal by using a greater power, a coverage increase effect may be expected.

In addition, according to an embodiment of the disclosure, in using the nonlinearity compensation model, the receiver may efficiently compensate for the nonlinearity of the received signal by selecting the model based on the internal situation of the transmitter. Through this, error vector magnitude (EVM), adjacent channel leakage ratio (ACLR), signal-to-noise ratio (SNR), or the like, which are evaluation indicators of signals, may be improved.

In addition, according to an embodiment of the disclosure, processing load may be reduced by efficiently selecting and using the nonlinearity compensation model without the need for the receiver to relearn the nonlinearity compensation model each time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
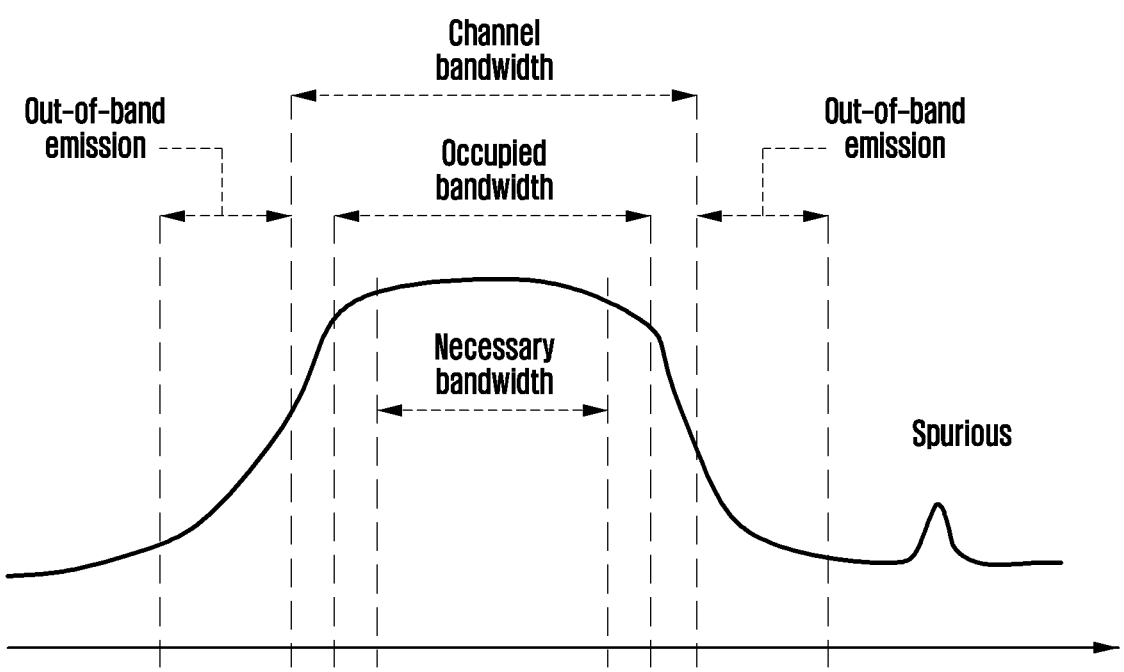
FIG. 1 is a diagram illustrating generation and interference of out-of-band emission in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card.

FIG. 1 is a diagram illustrating generation and interference of out-of-band emission in a wireless communication system according to an embodiment of the disclosure.

Referring to FIG. 1, in a 6G system, a high data rate must be supported in wider coverage, and smooth cooperation between a terminal (or user equipment (UE)) and a base station must be performed. In a general network situation, because there are multiple terminals and multiple base stations, signals may interfere with each other. Signal interference may occur even when frequency and time resources are not equally allocated, and a typical cause is out-of-band (OOB) emission. Due to such out-of-band emission, an interference signal may be generated in an adjacent channel in the process of transmitting a signal even though the frequency and time resources are different.

Figure 2:
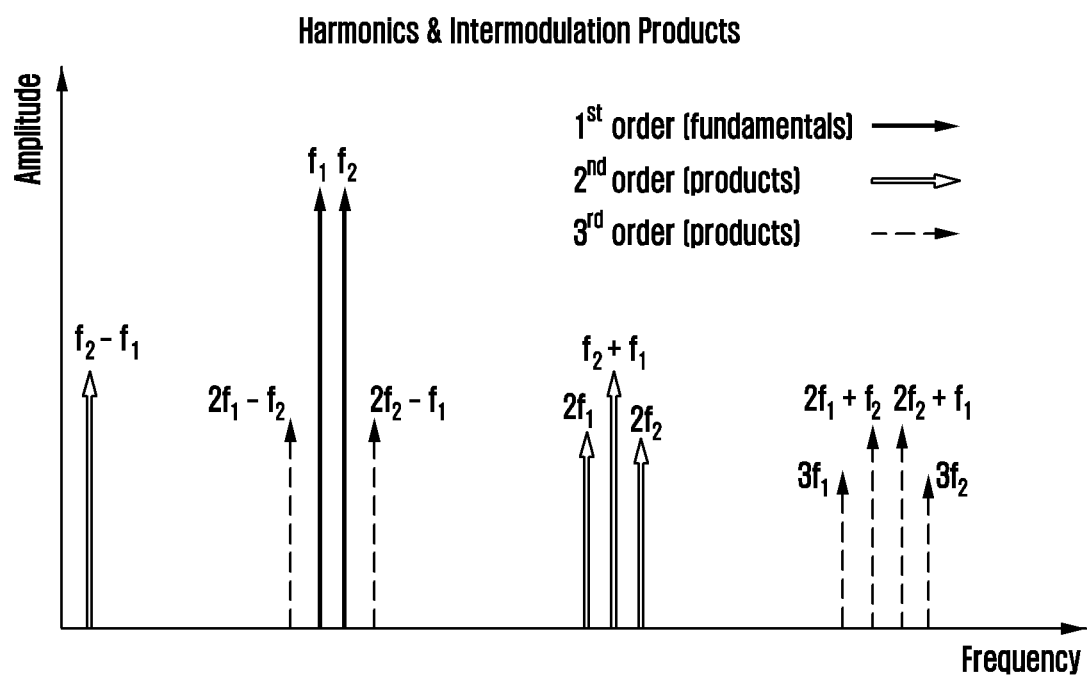
FIG. 2 is a diagram illustrating a high frequency signal generated due to nonlinearity according to an embodiment of the disclosure.

FIG. 2 is a diagram illustrating a high frequency signal generated due to nonlinearity according to an embodiment of the disclosure.

The reason for the interference signal is that the transmitter may not generate the data through completely linear amplification, in other words, in a series of signal amplification processes, nonlinearity is added to the signal, and high frequencies and their combinations generate new signals.

Referring to FIG. 2, as 1st order signals (fundamental signals) are amplified, 2nd order signals and 3rd order signals are generated, and among them, there are signals generated near the fundamental signals, so the nonlinearity eventually generates the OOB emission.

Figure 3:
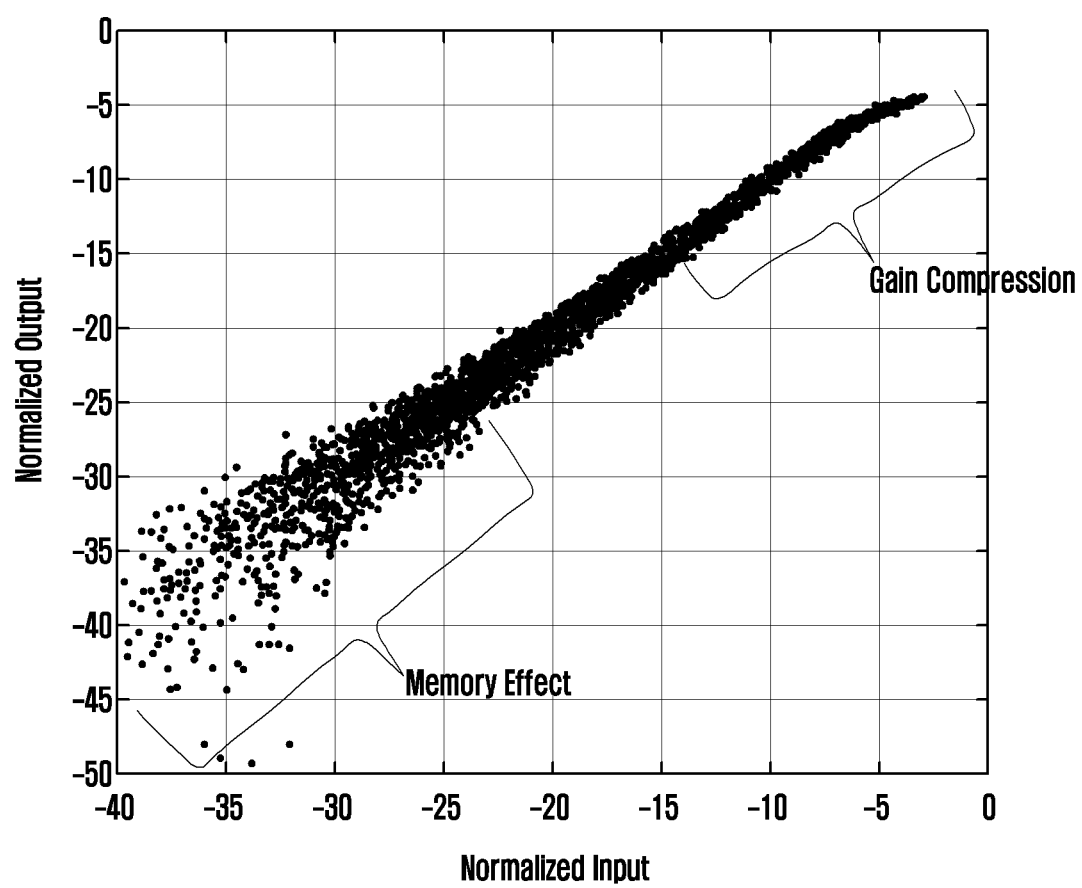
FIG. 3 is a diagram illustrating an example of nonlinearity of a power amplifier according to an embodiment of the disclosure.

FIG. 3 is a diagram illustrating a nonlinearity of a power amplifier according to an embodiment of the disclosure.

Referring to FIG. 3, there may be several parts where nonlinearity is added in the transmitter. Representative among these is a power amplifier (hereinafter referred to as a PA). A PA is an active RF circuit that exists at the end of a transmission path of a transmitter, and is a part that generates the signal with the highest power among amplifiers. Because the PA uses a large amount of DC batteries to generate signals with large power, in general, the PA needs to be designed for high efficiency. In general, various techniques are used to obtain a high-efficiency PA, and because these methods use nonlinearity, nonlinearity is inevitably added to the signal generated by the PA. Referring to FIG. 3, nonlinearity of the PA is illustrated. Because the graph is normalized, if the x-axis and y-axis values are the same, it is linearly amplified. However, in reality, as the intensity of the input of the PA increases, a gain compression phenomenon occurs in which the amplified ratio (gain) decreases, and a memory effect phenomenon occurs in the entire area, which is displayed as scattered dots rather than a single line. The memory effect refers to a phenomenon in which the magnitude or phase of the original nonlinearity component is changed by a signal generated due to past nonlinearity temporarily affecting the current nonlinearity. For this reason, a phenomenon in which the quality of an in-band signal, such as SNR or EVM is degraded may occur. The main cause of the memory effect is the bias line and thermal effect in the PA.

Figure 4:
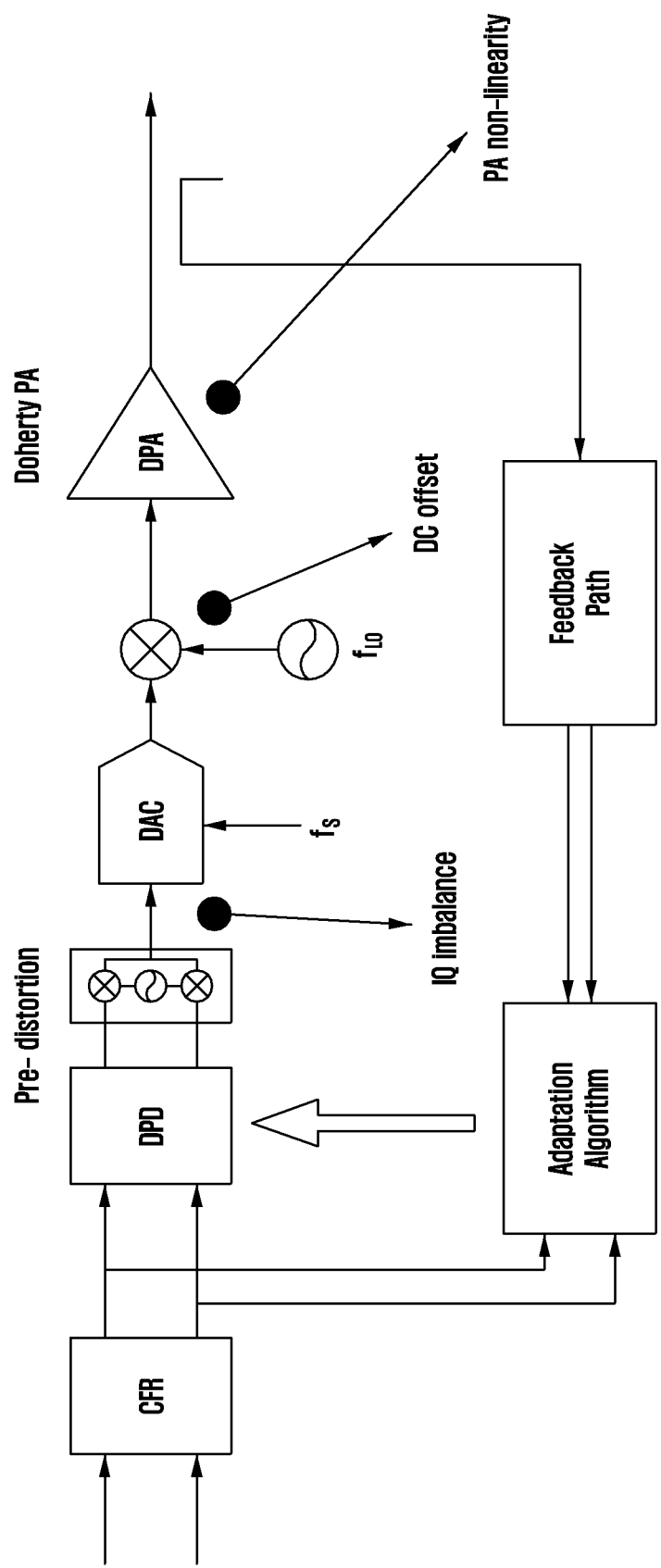
FIG. 4 is a diagram illustrating a cause of nonlinearity of a transmitter according to an embodiment of the disclosure.

FIG. 4 is a diagram illustrating a cause of nonlinearity of a transmitter according to an embodiment of the disclosure.

Referring to FIG. 4, the nonlinearity of the power of the signal transmitted from the transmitter may simply be referred to as 'nonlinearity of the transmitter' in the disclosure. Nonlinearity is not generated by PA only, but as illustrated in FIG. 4, the imbalance of the in-phase/quadrature-phase (I/Q) signal generated by a digital to analog converter (DAC) and the DC offset problem that occurs in the process of frequency up-conversion through the local oscillator (LO) mixer have also been found to be typical.

Figure 5:
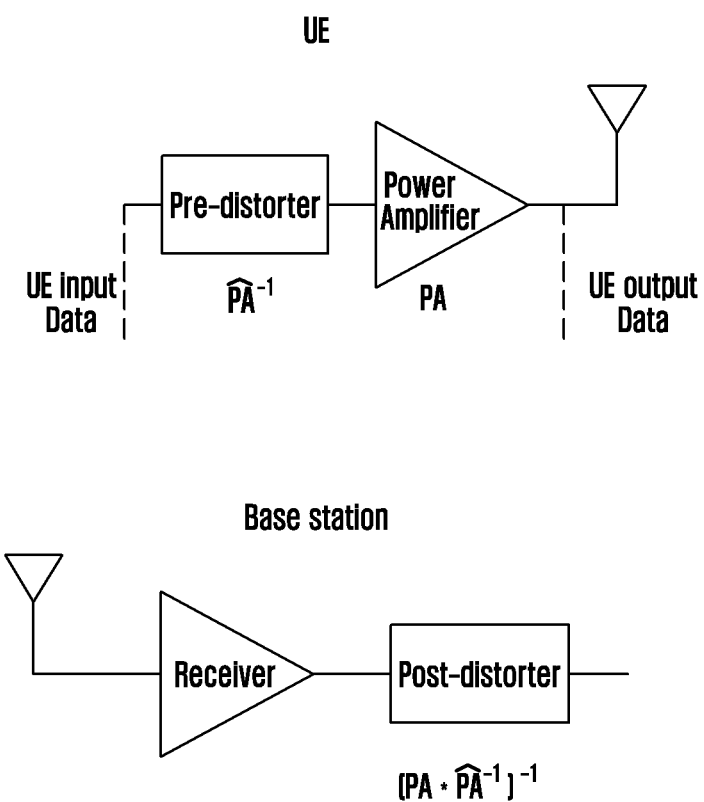
FIG. 5 is a diagram illustrating a pre-distorter of a transmitter and a post-distorter of a receiver according to an embodiment of the disclosure.

FIG. 5 is a diagram illustrating a pre-distorter of a transmitter and a post-distorter of a receiver according to an embodiment of the disclosure.

Referring to FIG. 5, it illustrates a case where a terminal is a transmitter and a base station is a receiver in an uplink scenario, but the scope of the disclosure is not limited thereto. For example, in a downlink scenario, a base station may be a transmitter and a terminal may be a receiver.

In the transmitter, it is common to use a digital pre-distortion (DPD) technique to secure linearity while maintaining the efficiency of a PA. The pre-distorter using the DPD technique may predict nonlinearity to be added at the transmitter and generate an input signal having a nonlinear component that cancels the nonlinearity in advance. Alternatively, it may be understood as performing an inverse function operation of the PA operation.

Several pre-distorter models may be used specifically for DPD. For example, the Volterra series of algorithms may be used, and a memory model may be used to compensate for the PA's memory effect. As a representative example, memory polynomial, generalized memory polynomial model, or the like, may be used as a pre-distorter model.

On the other hand, to correspond to the above-described DPD method, a method (post-distortion method) of removing nonlinearity remaining of the signal received by the receiver may also be considered. The DPD is generally widely used, but the post-distortion method is difficult to use except for satellite channels. Because the loss of the transmission signal must be reduced with a minimum configuration at the stage after the PA of the transmitter, only passive elements, such as antennas and switches need to be located. Accordingly, the post-distortion method is used at the receiver after the transmission signal has passed through the channel, in this case, a channel estimation must be preceded, so previously, there were limitations in using a post-distortion method that directly compensates for the operation of the PA at the receiver, except for cases where the channel is a simple satellite.

Referring to FIG. 5, the post-distorter performing a post-distortion operation is illustrated at the receiver, and in the disclosure, the post-distorter will be referred to by mixing with a nonlinear compensator (NC).

On the other hand, NC models may be designed based on formulas or artificial intelligence (AI). Recently, as a way to solve complex problems in communication systems, researches on ways to utilize AI technology are being actively conducted. For example, a research is being conducted to learn a demodulation reference signal (DMRS), a channel state information (CSI) map, or channel quality indicator (CQI) information reported by a terminal to a base station to an AI model, and to solve complex problems, such as channel estimation with the learned AI model. Alternatively, based on the learned AI model, discussions are under way to quickly process complex problems, such as channel coding, such as low-density parity-check (LDPC), polar coding, or the like. Unlike methods of deriving and applying complex formulas or methods based on specific rules of the related art, a method of applying AI technology has the advantage of being able to solve complex problems based on the learned AI model, as long as a data set capable of training the AI model is obtained. On the other hand, in a next-generation communication system, such as a 5G communication system or 6G to which the disclosure may be applied, operations for transmitting and receiving signals between a transmitter and a receiver are standardized, and the transmitter and the receiver transmit and receive signals according to mutually known information (e.g., time/frequency resources, or the like). Accordingly, it is possible to easily collect a data set capable of learning an AI model from signals transmitted and received between the transmitter and the receiver.

In particular, in the 5G communication system or the a next-generation communication system, such as the 6G to which the disclosure may be applied, a reference signal may be transmitted and received according to a predefined or preconfigured pattern (e.g., time and/or frequency resources) known to both the transmitter and the receiver at the same time. Here, the reference signal may include a demodulation-reference signal (DMRS), a channel state information-reference signal (CSI-RS), a sounding reference signal (SRS), or a phase tracking-reference signal (PT-RS). The DMRS is a reference signal for estimating a channel value required to demodulate a data portion in a received signal, and there are uplink DMRS and downlink DMRS, and may also be used for power allocation. For example, when the transmitter transmits the DMRS with the reference power and informs the receiver of the transmission power, the receiver compares the two power values to calculate the degree of power attenuation in the channel between the transmitter and the receiver. The CSI-RS is a reference signal transmitted from the base station to the terminal in order to determine the state of the downlink channel. When the base station generates and transmits the CSI-RS to the terminal, the terminal measures the CSI-RS and reports the CSI-RS measurement result related to the channel state to the base station (CSI report). On the other hand, the CSI-RS may be generated by multiplying a pre-designed weighting sequence to a pseudo random sequence made using a pre-defined algorithm. The SRS is a reference signal transmitted from the terminal to the base station in order to determine the state of the uplink channel. When the terminal transmits the SRS to the base station, the base station measures the SRS and reports the measurement result to the terminal, and the terminal reflects the result to the uplink signal transmission in future. In addition, the PT-RS is used for phase tracking. As described above, the reference signal is transmitted and received between the transmitter and the receiver according to a predefined or preconfigured pattern, and is mainly used to estimate a channel state. The receiver in an existing communication system compares a pattern in which the reference signal is transmitted with a signal actually received to estimate a channel, and the estimated value is used for scheduling, beam management, or an equalizer. On the other hand, the characteristic that the reference signal is transmitted and received according to the predefined or preconfigured pattern may be applied as an advantage in collecting data sets for learning AI models. Specifically, the pattern in which the reference signal is transmitted is predefined or preconfigured between the transmitter and receiver, and may be regarded as a kind of Ground-Truth value. Accordingly, in learning a supervised learning AI model, because the reference signal transmission pattern may be used as a labeling value, a labeled data set for training the AI model may be easily collected. In this regard, in the disclosure, the AI model may be used to determine the PA input/output relationship at the receiver, and the AI model may be learned based on the reference signal.

Hereinafter, the AI model learning described in the disclosure may be implemented as offline-training, which generates an initially well-trained model, or online-training, which updates the AI model in real time at specific periods or when specific events or conditions are met to reflect the continuously changed environment. Here, the offline-training is a method of pre-training the AI model with a data set. For example, according to an embodiment of the disclosure, the transmitter provides data (for example, the transmitter's time domain input-output I/Q data set, hereinafter referred to simply as 'time domain I/Q data') for learning the NC model to the receiver, and the receiver may generate the NC model through offline-training based on the data for learning the NC model. On the other hand, in a communication system where the surrounding environment continuously changes, it is also necessary to consider online-training in which the AI model may be continuously updated. For example, according to another embodiment of the disclosure, the transmitter may provide a reference signal (e.g., SRS or DMRS, or the like) for learning the NC model to the receiver, and the receiver may generate the NC model through online-training based on the reference signal. Because the pattern in which the reference signal is transmitted is predefined or preconfigured between the transmitter and receiver, the receiver may learn the NC model by comparing the pattern in which the reference signal is transmitted with the actually received signal.

The disclosure relates to the operation of an NC and utilizing the NC used by the receiver in a downlink (DL) and/or an uplink (UL) scenario, and to a configuration method for transmission and reception of information and data between the terminal and the base station and an NC operation.

Figure 6:
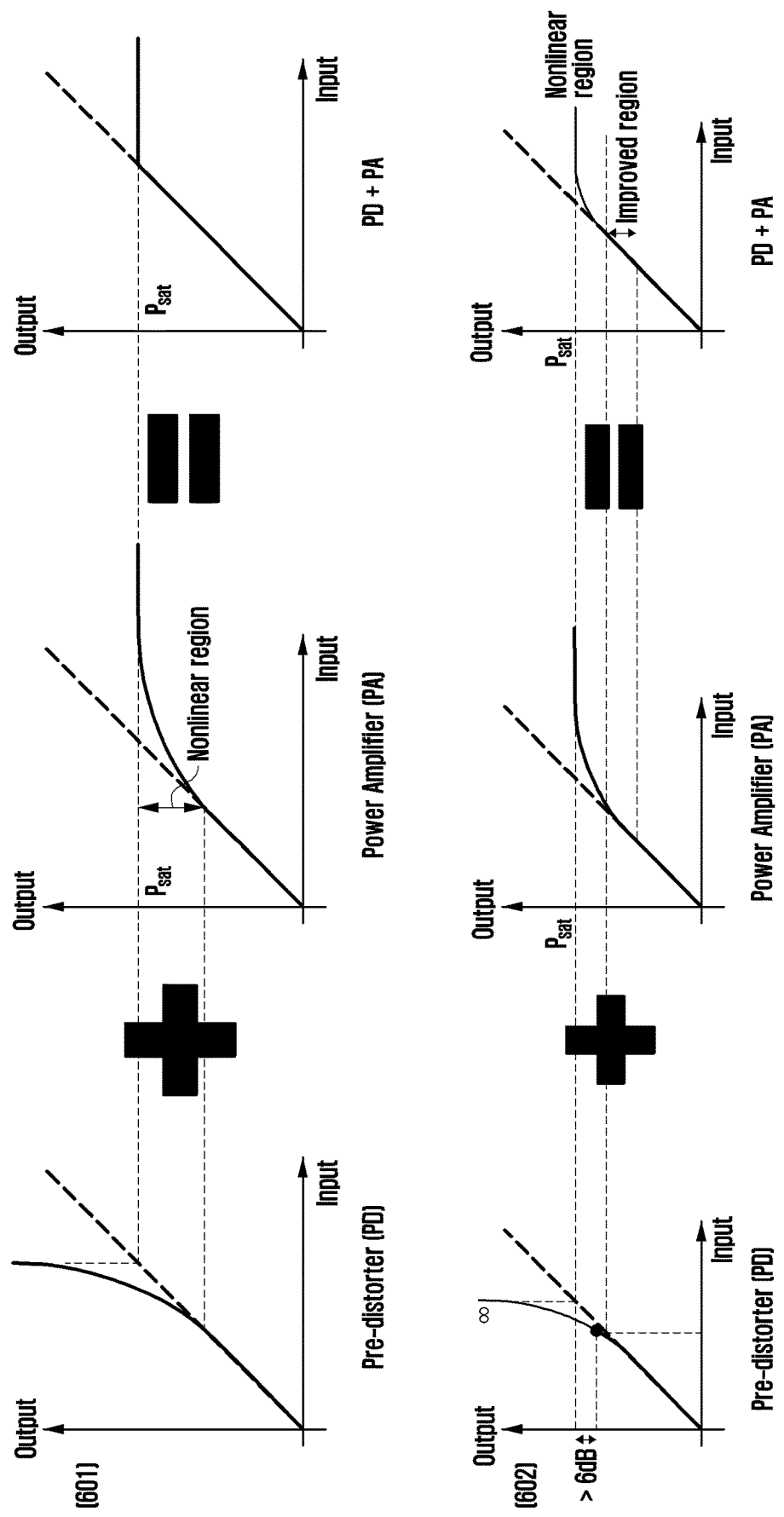
FIG. 6 is a diagram illustrating a theoretical operation concept and practical limitations of digital pre-distortion (DPD) according to an embodiment of the disclosure.

FIG. 6 is a diagram illustrating a theoretical operation concept and practical limitations of DPD according to an embodiment of the disclosure.

Referring to FIG. 6, the DPD typically compensates for the nonlinearity of the PA. In FIG. 6, a theoretical operating concept 601 of the DPD is illustrated. When the size of the PA's input increases, the PA's output does not increase beyond a certain portion and illustrates a gain compression phenomenon, and to compensate for this, an increased nonlinear input signal of the PA may be generated in the pre-distorter. As a result, the PA's output size is saturated and the signal may be linearly amplified until the point where the output power no longer increases.

However, unlike the theoretical concept of the DPD operation described above, the nonlinearity of the PA may not be completely compensated for in an actual situation. FIG. 6 illustrates an actual operation 602 of the DPD. To linearly improve the operation of the PA, an infinite size must be output from the pre-distorter. However, in the transmitter, the PA may produce the largest output, but it is placed in a contradictory situation that the pre-distorter must give out a larger output than the PA. Accordingly, in practice, because nonlinearity remains according to the limit of PA input power, the transmitter must reduce the power to a point where linearity may be secured, which is called power back-off.

Figure 7:
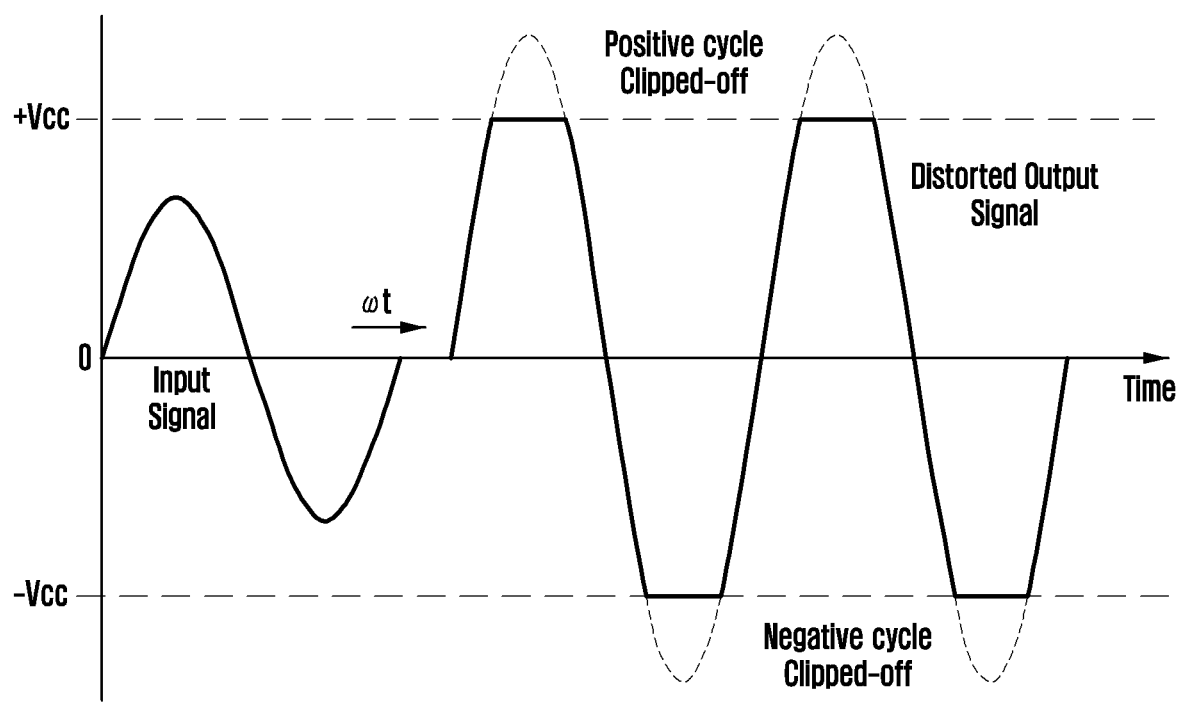
FIG. 7 is a diagram illustrating a cause of nonlinearity generated in a digital to analog converter (DAC) according to an embodiment of the disclosure.

FIG. 7 is a diagram illustrating a cause of nonlinearity generated in a DAC according to an embodiment of the disclosure.

In addition to the PA, other factors may also affect nonlinearity generation.

Referring to FIG. 7 illustrates a cause of nonlinearity generated in a DAC. The DAC needs to be located before the PA at the transmitter to generate a signal, and additional nonlinearity may occur in a case where the DAC also tries to generate a large signal.

Because of this, it is practically impossible to completely remove the nonlinearity at the transmitter, and theoretically, the remaining nonlinearity may be removed by using a post-distorter at the receiver.

The standard limits nonlinearity, which is specified as a requirement for error vector magnitude (EVM) and adjacent channel leakage ratio (ACLR) at the transmitter.

The DPD is designed to satisfy the linearity requirements, such as the EVM and the ACLR of the transmission signal with the performance, and the 3rd generation partnership project (3GPP) defines the linearity requirement value as follows.

Base Station: ACLR-45 dB, EVM 3% (256QAM)
Terminal (FR1): ACLR-30 dB, EVM 3.5% (256QAM)
Terminal (FR2): ACLR-17 dB, EVM 8% (64QAM)

In addition to the above values, there are various requirement values according to detailed conditions, such as operating band or modulation, but the DPD is generally designed to satisfy the above linearity requirements.

Because nonlinearity generally increases as the transmission power increases, the transmitter has to limit the transmit power to secure linearity, and power efficiency decreases accordingly. According to the disclosure, because the nonlinearity may be additionally improved at the receiver through the NC, the transmitter may transmit a signal with increased output power, thereby increasing additional coverage gain and transmitter efficiency. Transmitting by reducing the transmission power at the transmitter is referred to as performing power back-off operation, and transmitting the signal with higher output power by reducing the degree of power back-off is referred to as power boosting.

The disclosure relates to a method of using an NC operation to compensate for nonlinearity of the transmitter, and to signals that must be defined between the terminal and the base station in order to use the NC technology when the base station and the terminal perform a reception operation in 6G. Through the disclosure, the receiver may consider the internal nonlinearity information of the transmitter, and the receiver may perform a more efficient nonlinearity compensation operation by using several NC models.

Figure 8:
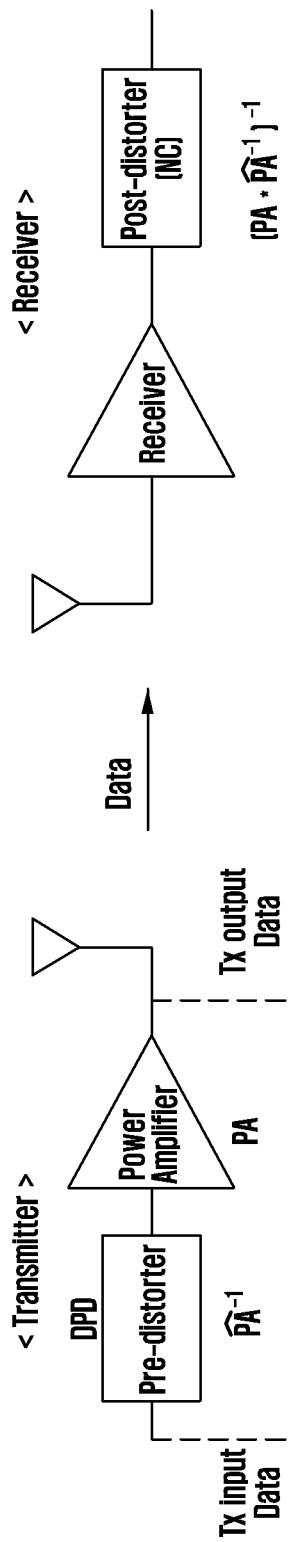
FIG. 8 is a diagram illustrating a process of transmitting data by using DPD in a transmitter and receiving data by using a nonlinear compensator (NC) in a receiver according to an embodiment of the disclosure.

FIG. 8 is a diagram illustrating a process of transmitting data by using DPD in a transmitter and receiving data by using an NC in a receiver according to an embodiment of the disclosure.

Referring to FIG. 8, the disclosure relates to a receiver using an NC operation, a transmitter that transmits a transmission signal with a larger output, expecting that the receiver will improve the nonlinearity, and a method in which the transmitter and the receiver share and manage information by configuring an index when nonlinearity changes according to an internal configuration of the transmitter.

The transmitter may or may not use the DPD, which is a general method, to compensate for nonlinearity, but this may not affect the NC operation of the receiver. The transmitter performing the NC operation configures a model that compensates for the remaining nonlinearity of the signal received from the transmitter, and the nonlinearity compensation model may be designed based on the difference between Tx input data and Tx output data of the transmitter (Tx). If the DPD is not used at the transmitter, the NC will be including the inverse function of the PA operation, and if the DPD is used, the NC will be including the inverse function of the remaining nonlinearity.

Through the method proposed in the disclosure, the receiver may consider the internal nonlinearity information of the transmitter, and the receiver may perform a more efficient nonlinearity compensation operation by using several NC models.

The NC model may be configured according to the performance of the transmitter. For example, if the type of the PA used by the transmitter is different or the operating frequency and bandwidth are different, the nonlinearity and PA operation of the transmitter may be different. In addition, even for Pas with the same model name or identically designed Pas within the same radio-frequency integrated circuit (RFIC) chip, a difference in performance of around 5% may occur due to process variation that occurs during mass production, and for this reason, the receiver must use a different NC model to effectively compensate for the nonlinearity of the transmitter. In addition, one of the representative causes of change in nonlinearity is heat generation, and because the performance of RF devices generally decreases as heat increases, it is necessary to change the NC model once generated without using the NC model permanently.

In addition, when there are a plurality of terminals scheduled for uplink transmission, the base station needs data for establishing each NC model because the base station needs NC models corresponding to each terminal.

Figure 9:
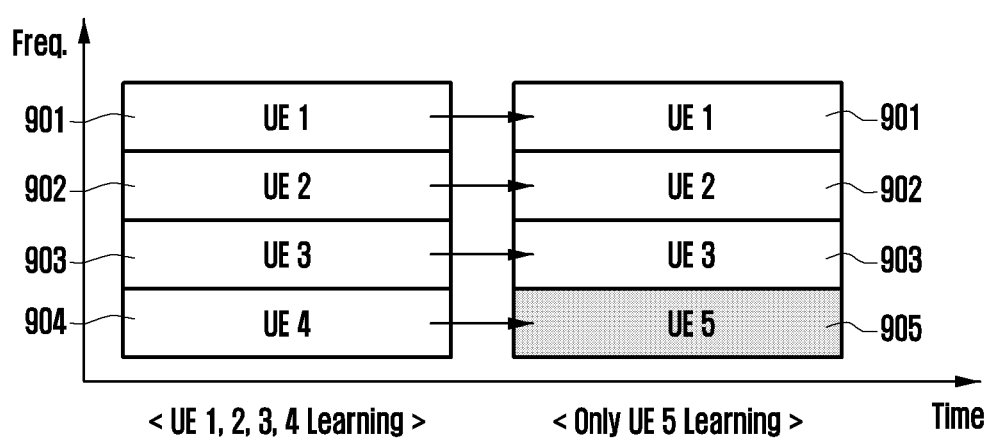
FIG. 9 is a diagram illustrating a method of learning an NC model when several UEs are scheduled according to an embodiment of the disclosure.

FIG. 9 illustrates a method of learning an NC model when several UEs are scheduled according to an embodiment of the disclosure.

Referring to FIG. 9, in a situation in which the base station has scheduled 4 terminals 901, 902, 903, and 904, if time passes and the scheduling is changed to UE 5 905 instead of the UE 4 904, the base station needs to reuse the NC models for the UE 1 901, the UE 2 902, and the UE 3 903 among the NC models learned with the data of the 4 initially established terminals 901, 902, 903, and 904, and receive data for the UE 5 905 and additionally generate an NC model for the UE 5 905.

On the other hand, the NC method is to compensate for the nonlinearity of the transmitter by the receiver, but in general, the receiver does not know the physical configuration of the transmitter. The 6G system uses many frequency bands and bandwidths due to its complexity, and the transmitter may consist of multiple antennas and multiple PAs. Accordingly, even if the transmitter transmits the same signal, it may have different nonlinearity depending on which PA the signal is transmitted through among the multiple PAs configured in the transmitter. Because it is common for the transmitter to change a PA or an antenna without notifying the receiver, the receiver does not know through which PA or antenna the transmitter physically transmits the signal, resulting in nonlinearity.

Figure 10:
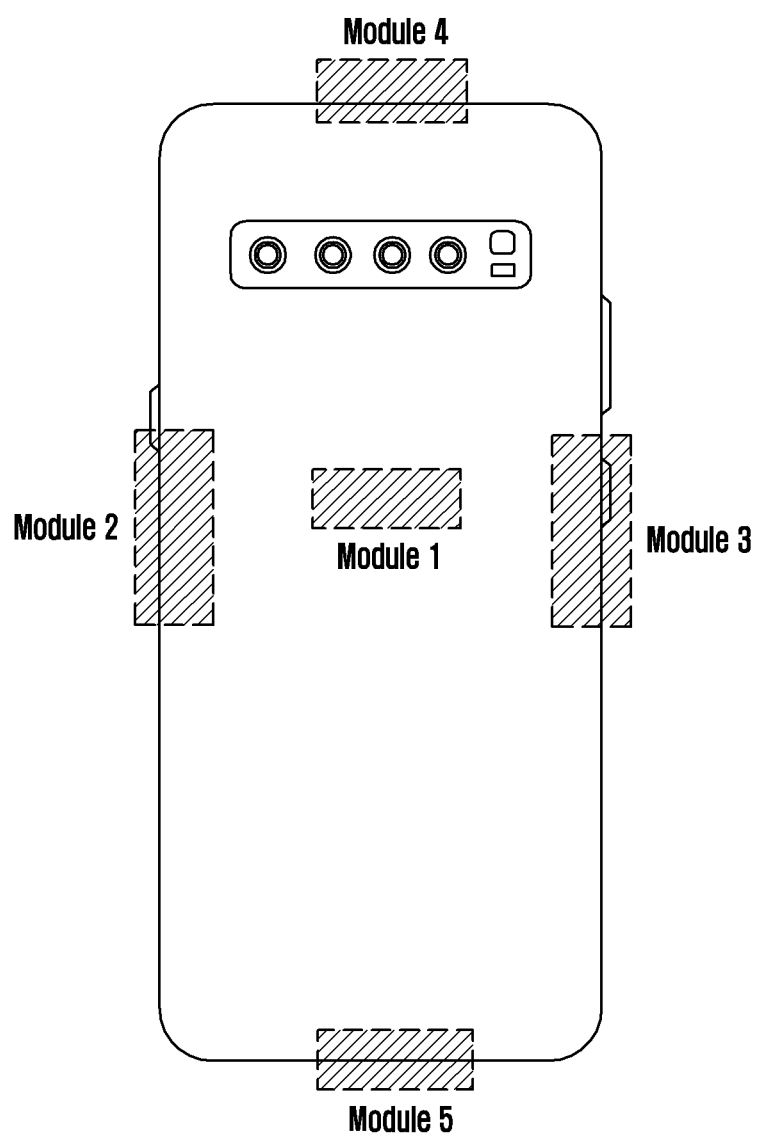
FIG. 10 is a diagram illustrating an example in which an antenna module is disposed in a terminal using a frequency range 2 (FR2) frequency band according to an embodiment of the disclosure.

FIG. 10 is a diagram illustrating an antenna modules are disposed in a terminal using an FR2 frequency band according to an embodiment of the disclosure.

Referring to FIG. 10, in frequency range 2 (FR2), which includes a frequency band of 24 to 100 GHz, a beamforming system is used, and as the frequency increases, the size of the RFIC and the antenna is reduced to form a single module. Several modules may be located in different directions in a mobile phone terminal, and may communicate through beams in the corresponding directions. Each module has a different PA, and even in a scenario where the same signal must be transmitted, the module may be selected depending on which module is covered by a hand or which beam has the most optimal performance. Because each module requires a different NC model, the NC model may need to be changed when the module is changed.

Figure 11:
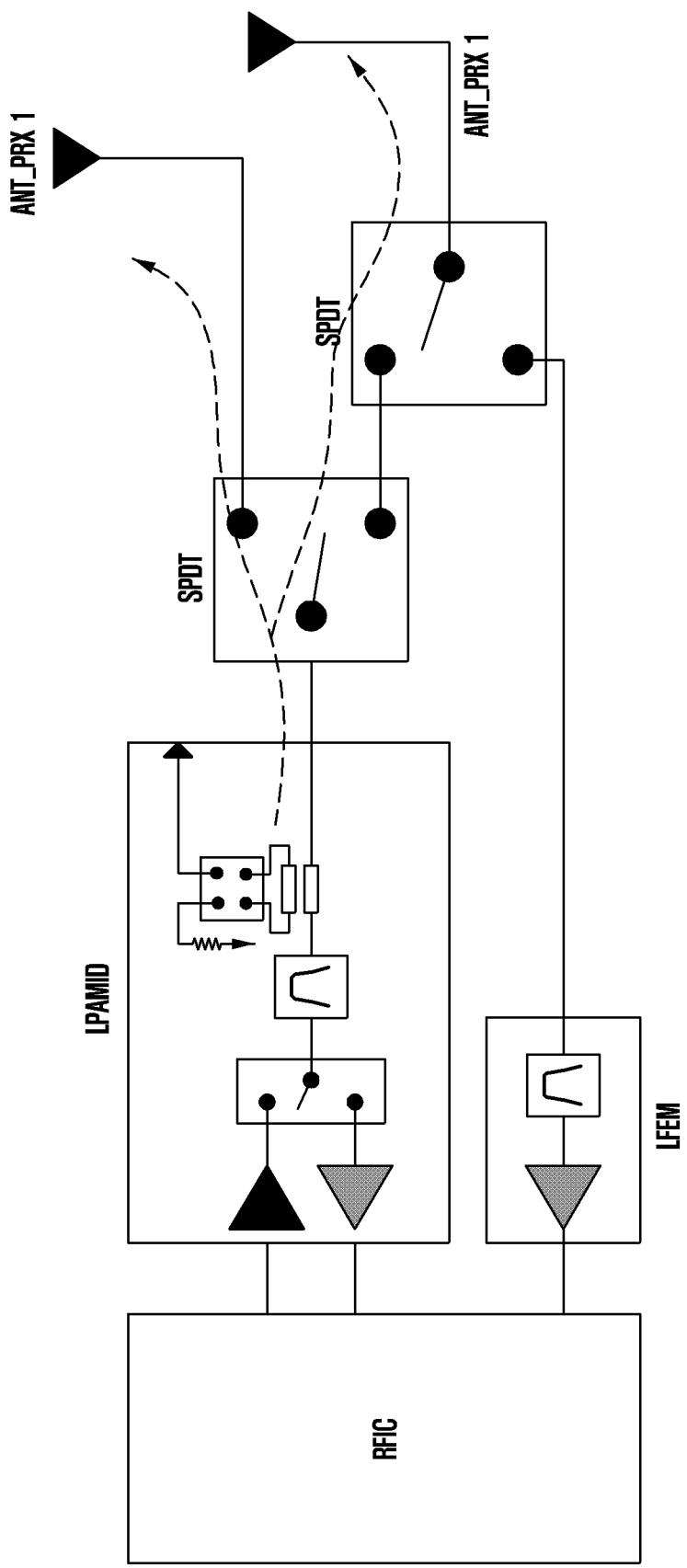
FIG. 11 is a diagram illustrating a transmission path according to antenna selection of a transmitter according to an embodiment of the disclosure.

FIG. 11 is a diagram illustrating a transmission path according to antenna selection of a transmitter according to an embodiment of the disclosure.

Referring to FIG. 11, it is illustrated that an antenna path for signal transmission is changed in frequency range 1 (FR1) including a sub-6 GHz frequency band. Different antenna paths may be selected according to the degree of being covered by the mobile phone user's hand or signal sensitivity, and even if the PA is the same, because the signal attenuation of each antenna path is different, it is necessary to apply a different NC model.

Figure 12:
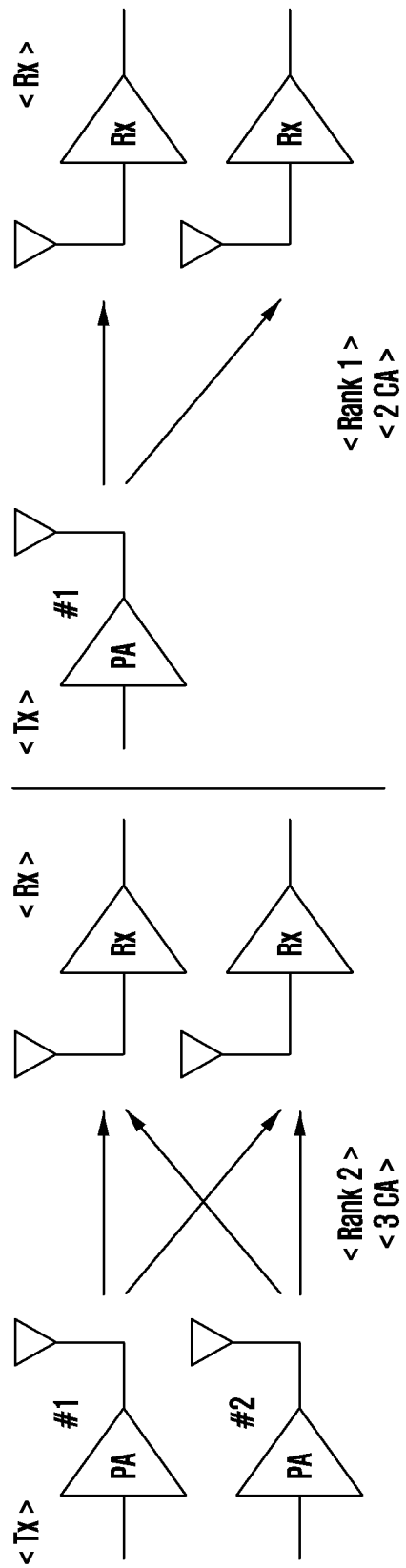
FIG. 12 is a diagram illustrating a plurality of power amplifiers (PAS) used in a MIMO or carrier aggregation (CA) scenario according to an embodiment of the disclosure.

FIG. 12 is a diagram illustrating a plurality of PAs used in a MIMO or CA scenario according to an embodiment of the disclosure.

Referring to FIG. 12, in addition to the change of the module of the mobile phone terminal and the change of the antenna path described above in FIGS. 10 and 11, the nonlinearity of the transmitter may be changed even in the case of a multi input multi output (MIMO) scenario or a carrier aggregation (CA) scenario. This is an example in which the nonlinearity is changed at a frequency of a physical layer level of the transmitter. In the MIMO scenario, the transmitter has multiple PAs, but the receiver may need an individual NC model for each PA. When the operation is changed to the single input single output (SISO) thereafter, the receiver needs to know the NC model to be used. Even in the case of CA, because the PA corresponding to each component carrier (CC) may exist separately, the PA configuration may be different in the case of CA combined with 3CCs and CA combined with 2CCs, and the receiver needs to classify the NC model.

In addition, in time division duplex (TDD), when a terminal transmits a reference signal (e.g., sounding reference signal, SRS), the terminal may use an SRS switching function using multiple antennas. In this case, the base station may need a different NC model for each antenna, and the base station may select a corresponding NC model only when indicating whether the PA of the antenna transmitting the SRS is the same as the PA of the antenna used for subsequent data transmission.

The above examples of the nonlinearity of the transmitter have been explained mainly on the nonlinearity occurring in the PA for convenience of description, but the nonlinearity of the transmitter may occur for various reasons depending on configurations on the network and the development process, design, and implementation of the transmitter itself. Accordingly, the receiver may not simply determine the nonlinearity of the transmitter based on the PA number or the number of the antenna path. The disclosure proposes a method in which, when a change in the nonlinearity occurs in the transmitter, the transmitter transmits nonlinear state information (NSI) to the receiver so that the receiver, having received the NSI, uses a different NC model. In addition, in the disclosure, the NSI may be referred to as a nonlinearity state indicator, a nonlinearity state index, and the like.

As illustrated in Table 1 below, the NSI may be classified according to configurations on a network and the development process, design, and implementation of the transmitter itself. However, Table 1 is only an example for convenience of understanding, and the reason for changing the specific NSI # and nonlinearity is not limited to the example in Table 1.

TABLE 1

| Reason for changing nonlinearity | PA # | Path # | INSI # | Signaling |
|---|---|---|---|---|
| Tx power boosting impossible | — | — | 0 | RRC |
| Tx module change | 1 | — | 1 | RRC |
|  | 2 | — | 2 |  |
|  | 3 | — | 3 |  |
| Tx Ant. change | 1 | 1 | 1 | RRC |
|  |  | 2 | 4 |  |
| HPUE, Transparent Tx Diversity | 1, 2 | — | 5 | DCI/UCI MAC CE |
| SISO | 1 | — | 1 | — |
|  | 2 | — | 2 | — |
| MIMO | 1 | — | 1 | DCI/UCI |
|  | 2 | — | 2 | MAC CE |
| CA | 1, 2, 3 (3CA) | — | 6 | DCI/UCI |
|  | 1, 3 (2CA) | — | 7 | MAC CE |
|  | 2, 3 (2CA) | — | 8 |  |
| Delay budget request | — | — | 9 | UCI MAC CE |
| Re-training request | — | — | 15 | DCI/UCI MAC CE |

On the other hand, because the transmitter does not need to inform the receiver of the reason for the change in internal nonlinearity of the transmitter, it may be sufficient for the transmitter to transmit the NSI to the receiver. In addition, the case where NSI is changed may include a case where power boosting of the transmitter is impossible due to a temporary cause in addition to the change in nonlinearity. If the NC support capability (e.g., whether the NC support is available, the number of supported NC models, or the like), which was previously informed to the receiver, changes due to some reason, such as heat inside the transmitter, the receiver may be informed of this change through the NSI. In addition, when the receiver performs the NC operation, a delay may occur due to additional data processing, and the transmitter may request a delay budget through the NSI.

Alternatively, as illustrated in Table 1, the transmitter may not operate multiple NSIs, and transmit 1-bit information indicating the need to change the NC model to the receiver, and the receiver may learn the NC model whenever information indicating the need to change the NC model is received. Through this, there is an advantage in that radio resources may be saved.

Due to internal development circumstances of the transmitter, the nonlinearity of the transmitter may be changed for various reasons. For example, a high power user equipment (HPUE) and a transparent Tx diversity are other examples of transmitting one signal by using multiple PAs and antennas. In Table 1, NSI 0 to 15 are indicated using 4 bits as an example, but the range (the number of NC models or the number of NSIs that the receiver may support for the transmitter) of the NSI may be variously determined according to the performance of the receiver or network conditions, and the transmitter may be informed of the range of NSIs operable by the receiver. Alternatively, the range of the NSI may be a specific value predefined on the network, and the transmitter and receiver may inform the transmitter of the NSI range when the range of NSI supported by the receiver is changed while using a predefined default NSI range. By dividing and transmitting the NSI for each NC model expected by the transmitter according to the range and development performance of the NSI, the receiver may effectively compensate for the nonlinearity of the received signal.

Because a NC model generation may be derived computationally through data or generated through learning through AI technology, in the disclosure, the model generation or model learning is referred to without distinction. Data necessary for the NC model generation or learning may be specifically expressed in IQ data format in the time domain of Tx input data and Tx output data of the transmitter. The data may be expressed as I (in-phase) and Q (quadrature phase) values for each time sample according to the used fast Fourier transform (FFT) size, and each of 14 symbols constituting one slot may have a time domain I/Q value corresponding to FFT size. For example, IQ data for one NSI # may be configured as illustrated in Table 2 below.

TABLE 2

| Sample # | Tx input Data-I | Tx input Data-Q | Tx Output Data-I | Tx Output Data-Q |
|---|---|---|---|---|
| 1 | 0.009344 | −0.04715 | −0.12114 | −0.07337 |
| 2 | −0.04967 | 0.06479 | 0.002204 | 0.11799 |
| 3 | 0.114221 | −0.01281 | 0.072064 | −0.04304 |
| ... | −0.09803 | −0.09916 | −0.03287 | −0.02682 |
| 1024 (ex. FFT size) | −0.02485 | 0.150545 | −0.02211 | −0.00533 |

In the case of DPD, because the nonlinearity of the transmitter is compensated by the transmitter itself, unlike the fact that the transmitter itself knows the data for generating the nonlinearity model, in the case of the NC operation, the receiver needs to receive a signal for generating the nonlinearity model from the transmitter.

The NC operation proposed in the disclosure may consider the following scenario.
1. Signal types for nonlinear model generation (learning)
   A. Transmission of time domain I/Q data of the transmitter to the receiver
   B. The transmitter transmits a reference signal (RS), and the receiver guesses through the configured RS pattern
2. Frequency at which NC model is learned
   A. The receiver always performs the NC model learning in every slot in a scheduling unit
   B. The receiver learns the NC model only at the beginning and relearns the NC model when nonlinearity changes.

Figure 13:
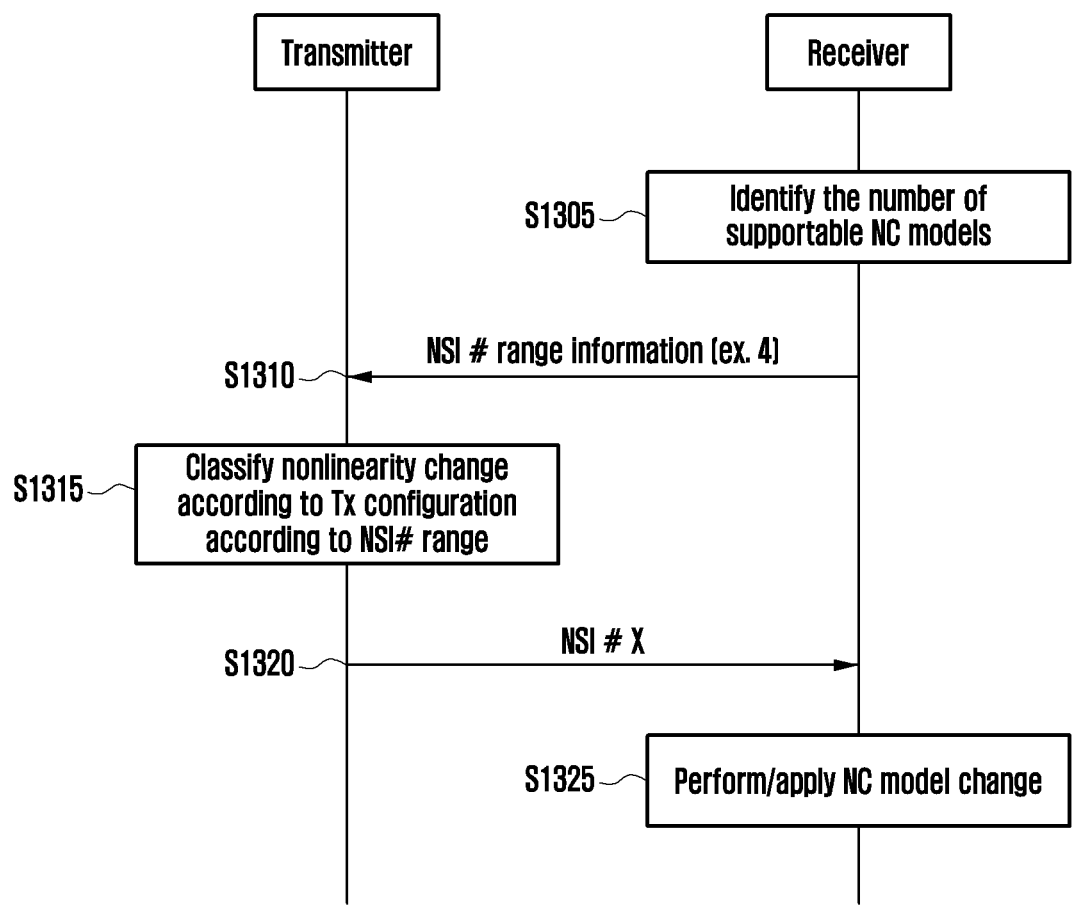
FIG. 13 is a sequence diagram illustrating a procedure for a receiver to provide a number of usable NC models to a transmitter according to an embodiment of the disclosure.

FIG. 13 is a sequence diagram illustrating a procedure for a receiver to provide the number of usable NC models to a transmitter according to an embodiment of the disclosure.

Referring to FIG. 13, because the number of the NC models (or the range of NSI, which will be used interchangeably hereinafter) that may be operated by the receiver is generally limited, it is possible to transmit information on the range of the NSI to be reported by the transmitter. Alternatively, a specific value may be predefined for the range of NSI on the network, and when the range of NSIs supported by the receiver is changed, it is also possible to inform the transmitter of the NSI range while the transmitter and the receiver use the range of NSI of the predefined default value.

In operation S1305, the receiver may identify the number of NC models supported for the transmitter.

In operation S1310, the receiver may transmit range information on the NSI. In the case of uplink, the NSI range information may be transmitted when a base station requests data for generating a nonlinearity model. In the case of downlink, the NSI range information may be included in a UE capability message of the UE and transmitted. In the case of the NSI range information, because it is not expected to change frequently, transmission through radio resource control (RRC) signaling may be efficient.

In operation S1315, the transmitter may classify the nonlinearity change according to the Tx configuration according to the range of the NSI. For example, in a case where the receiver informs the transmitter that the number of operable NC models is 4, the transmitter classifies the degree of nonlinearity change of the transmission signal into 4 types according to changes in the network or internal conditions of the transmitter, and selects the most similar NSI according to the configuration used for data transmission. The transmitter transmits the data necessary for NC model learning through a general signal transmission process without power boosting through the allocated (or allocating) resources, and through this, the receiver may perform post-distortion model training (PD training) or NC model learning.

In operation S1320, the transmitter may transmit the NSI selected according to the nonlinearity change to the receiver.

In operation S1325, the receiver may change and apply the NC model corresponding to the NSI received from the transmitter. Thereafter, the transmitter and the receiver may transmit and receive data according to the NSI. For example, the transmitter may transmit data by using greater power, expecting that the receiver will compensate for the nonlinearity of the transmitter by applying the NC model corresponding to the NSI. The receiver may apply the NC model corresponding to the NSI received from the transmitter to compensate for nonlinearity of the transmitter and receive data.

Among the above-described embodiments and methods, each configuration or step may be selectively combined/mixed and applied. In addition, not all of the steps described above must be included according to configurations and/or definitions on the system, and some steps may be omitted.

Hereinafter, a method of establishing (learning) an NC model by using data necessary for the NC model learning will be described. Because the NC operation is performed by the receiver, the procedure may be different depending on whether it is uplink or downlink. In addition, the NC model may be established in such a way that the transmitter transmits direct data necessary for learning the NC model to the receiver.

For example, the transmitter may transmit data necessary for the NC model learning through physical uplink share channel (PUSCH) (when the transmitter is a terminal) or physical downlink share channel (PDSCH) (when the transmitter is a base station). Data required for the NC model learning may refer to data obtained by converting time domain I/Q data of a transmitter into information bits. For example, as mentioned above, the data necessary for the NC model learning may refer to real and imaginary values represented in units of time samples by the sampling rate applied according to the FFT function. Because these values need to be paired as Tx input data/Tx output data, they may be including 4 values for each time sample. For example, if an FFT size of 1024 is used, the time domain I/Q data for one NSI may consist of 1024 (FFT size)×4 (Tx input I, Tx input Q, Tx output I, Tx output Q)=4096 values. Table 2 above illustrates an example of the time domain I/Q data for one NSI. In addition, because the time domain I/Q data will be required for each NSI, if the transmitter transmits the time domain I/Q data for all NSIs at once, assuming that the range of NSIs that may be supported is 4, the time domain I/Q data for the entire NSI is 4 (NSI range or number of NC models)×1024 (FFT size)×4 (Tx input I, Tx input Q, Tx output I, Tx output Q)=16384 values may consist of.

Figure 14:
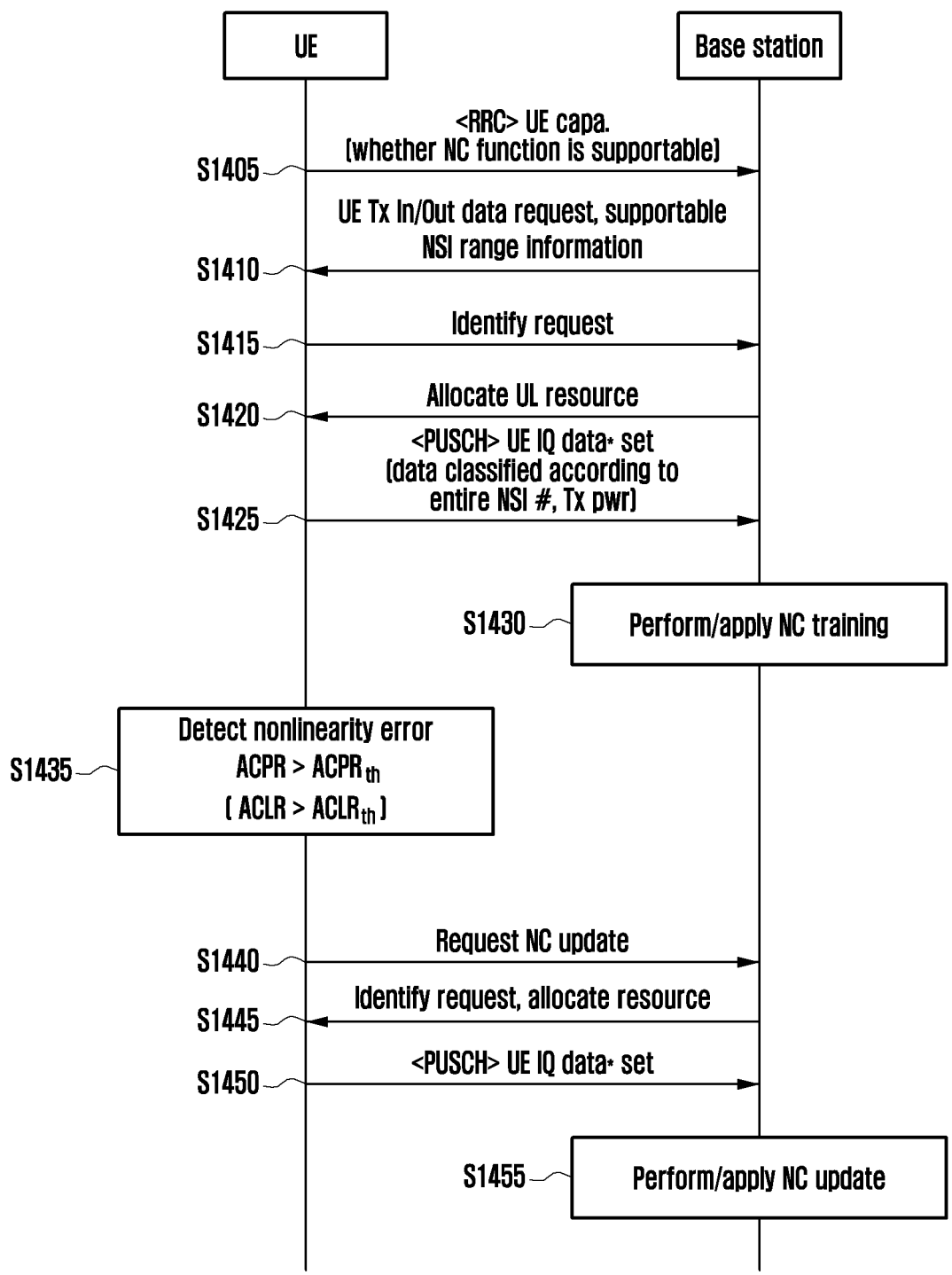
FIG. 14 is a sequence diagram illustrating a procedure for a base station to establish an NC model by using data necessary for NC model learning in case of uplink transmission according to an embodiment of the disclosure.

FIG. 14 is a sequence diagram illustrating a procedure for a base station to establish an NC model by using data necessary for NC model learning in case of uplink transmission according to an embodiment of the disclosure.

Referring to FIG. 14, in operation S1405, a terminal may transmit an RRC message including UE capability information to the base station. The UE capability information may indicate whether transmission based on an NC operation is supported.

In operation S1410, the base station may request data necessary for the NC model learning from the terminal. In this case, the base station may transmit information on the range of supported NSI together. The data request and NSI range information may be transmitted together in the same message or may be transmitted separately.

In operation S1415, the terminal may transmit a response (or request confirmation) message to the request for data necessary for the NC model learning by the base station.

In operation S1420, the base station may transmit uplink resource allocation information (e.g., UL grant) for the terminal to transmit data necessary for NC model learning to the terminal. The uplink resource allocation information may be transmitted through DCI. In this case, the amount of uplink resources may be determined according to a range of NSIs that the base station may support.

In operation S1425, the terminal may transmit data necessary for the NC model learning to the base station by using the allocated uplink resources. Data necessary for the NC model learning may be transmitted through a physical uplink share channel (PUSCH). In this case, data necessary for the NC model learning may include time domain I/Q data of the terminal for the entire NSI range supported by the base station.

In operation S1430, the base station may learn (or generate) and apply an NC model based on data necessary for the NC model learning. The NC model may be generated either formula-based or AI-based. Thereafter, the terminal and the base station may transmit and receive uplink data according to the generated NC model.

In operation S1435, the terminal may detect an error of nonlinearity. For example, if an error occurs in the nonlinearity of the terminal due to internal reasons, such as heat generation in the terminal after the initial generation of the NC model, the NC model may need to be updated. To this end, in a case where a value, such as adjacent channel leakage ratio (ACLR) or adjacent channel power ratio (ACPR) exceeds a specific threshold by identifying nonlinearity in the terminal, the terminal may detect a nonlinearity error and determine that the NC model needs to be updated.

In operation S1440, the terminal may request an NC model update from the base station. In this case, 1-bit information simply requesting an NC model update may be transmitted, and information indicating NSIs (e.g., NSI #1 and 3) or the number (e.g., 2) of NSIs requiring the NC model update may be transmitted together.

In operation S1445, the base station may identify the NC model update request and transmit uplink resource allocation information (e.g., UL grant) for the terminal to transmit data necessary for the NC model update. The uplink resource allocation information may be transmitted through DCI. In this case, the amount of uplink resources may be determined according to a range of NSIs that the base station may support. Alternatively, the amount of uplink resources may be determined according to the number of NSIs that needs to update the NC model transmitted by the terminal.

In operation S1450, the terminal may transmit data necessary for updating the NC model to the base station by using the allocated uplink resources. Data necessary for updating the NC model may be transmitted through PUSCH. In this case, the data necessary for updating the NC model may include time domain I/Q data of the terminal for the entire NSI range supported by the base station, or may include only time domain I/Q data of the terminal for the NSI requiring NC model update.

In operation S1455, the base station may update and apply the NC model based on data necessary for updating the NC model. Updating the NC model may refer to newly learning the NC model through the aforementioned formula-based or AI-based method. Thereafter, the terminal and the base station may transmit and receive uplink data according to the updated NC model.

Among the above-described embodiments and methods, each configuration or step may be selectively combined/mixed and applied. In addition, not all of the steps described above must be included according to configurations and/or definitions on the system, and some steps may be omitted.

Figure 15:
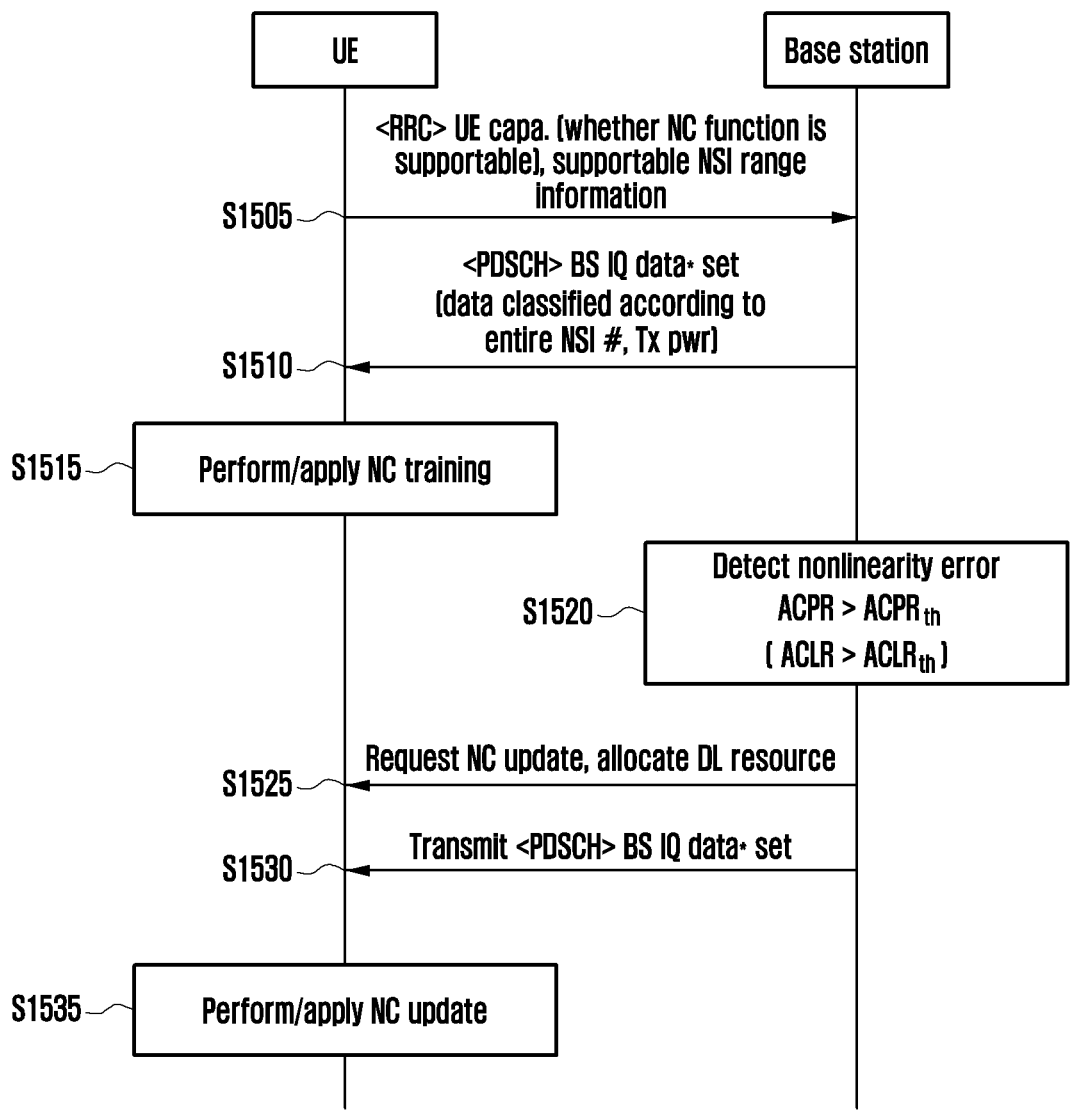
FIG. 15 is a sequence diagram illustrating a procedure for a terminal to establish an NC model by using data necessary for NC model learning in case of downlink transmission according to an embodiment of the disclosure.

FIG. 15 is a sequence diagram illustrating a procedure for a terminal to establish an NC model by using data necessary for NC model learning in case of downlink transmission according to an embodiment of the disclosure.

Referring to FIG. 15, in operation S1505, a terminal may transmit an RRC message including UE capability information to the base station. The UE capability information may indicate whether transmission based on an NC operation is supported. In addition, the UE capability information may indicate a range of supported NSIs. Information on the range of supported NSIs may be included in the UE capability information or may be configured as separate information.

In operation S1510, the base station may transmit data necessary for the NC model learning to the terminal. Data necessary for the NC model learning may be transmitted through a physical downlink share channel (PDSCH). In this case, data necessary for the NC model learning may include time domain I/Q data of the base station for the entire NSI range supported by the terminal.

In operation S1515, the terminal may learn (or generate) and apply an NC model based on data necessary for the NC model learning. The NC model may be generated either formula-based or AI-based. Thereafter, the terminal and the base station may transmit and receive downlink data according to the generated NC model.

In operation S1520, the base station may detect an error of nonlinearity. For example, if an error occurs in the nonlinearity of the base station due to internal reasons, such as heat generation in the base station after the initial generation of the NC model, the NC model may need to be updated. To this end, in a case where a value, such as adjacent channel leakage ratio (ACLR) or adjacent channel power ratio (ACPR) exceeds a specific threshold by identifying nonlinearity in the base station, the base station may detect a nonlinearity error and determine that the NC model needs to be updated.

In operation S1525, the base station may request an NC model update from the terminal. In this case, 1-bit information simply requesting an NC model update may be transmitted, and information indicating NSIs (e.g., NSI #1 and 3)

or the number (e.g., 2) of NSIs requiring the NC model update may be transmitted together. In addition, the base station may transmit downlink resource allocation information (e.g., DL assignment) for transmitting data necessary for updating the NC model to the terminal. The downlink resource allocation information may be transmitted through DCI. An indicator requesting the NC model update may be transmitted through a DCI format, such as downlink resource allocation information or through separate information. In this case, the amount of downlink resources may be determined according to a range of NSIs that the terminal may support. Alternatively, the amount of downlink resources may be determined according to the number of NSIs that needs to update the NC model.

In operation S1530, the base station may transmit data necessary for updating the NC model to the terminal by using the allocated downlink resources. Data necessary for updating the NC model may be transmitted through PDSCH. In this case, the data necessary for updating the NC model may include time domain I/Q data of the base station for the entire NSI range supported by the terminal, or may include only time domain I/Q data of the terminal for the NSI requiring NC model update.

In operation S1535, the terminal may update and apply the NC model based on data necessary for updating the NC model. Updating the NC model may refer to newly learning the NC model through the aforementioned formula-based or AI-based method. Thereafter, the terminal and the base station may transmit and receive downlink data according to the updated NC model.

Among the above-described embodiments and methods, each configuration or step may be selectively combined/mixed and applied. In addition, not all of the steps described above must be included according to configurations and/or definitions on the system, and some steps may be omitted.

Figure 16:
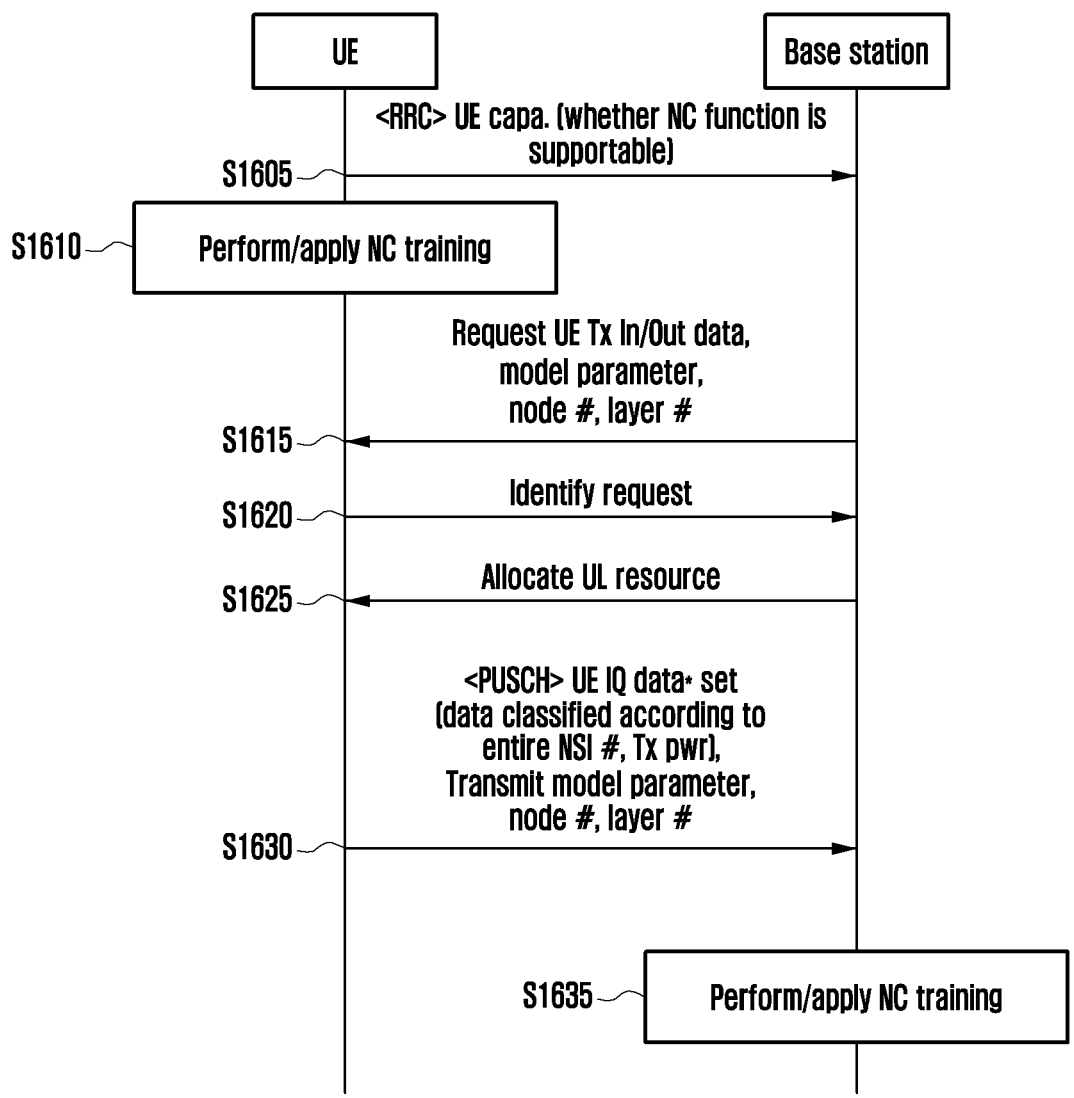
FIG. 16 is a sequence diagram illustrating a procedure for establishing an NC model by transmitting some or all of a result values learned by a terminal to a base station according to an embodiment of the disclosure.

FIG. 16 is a sequence diagram illustrating a procedure for establishing an NC model by transmitting some or all of the result values learned by the terminal to the base station according to an embodiment of the disclosure.

Referring to FIG. 16, data required for an NC compensation model learning generally requires time domain I/Q data. However, when a transmitter and a receiver use a general and common algorithm or artificial intelligence learning based on a neural net (NN), a method in which the transmitter performs some learning and delivers the result to the receiver is also possible in order to share the burden of learning. This technique of using a model learned in a specific task and reusing the same in another task is called transfer learning, and has the effect of increasing the speed of learning and reducing the burden. According to an embodiment of the disclosure, the transmitter may transmit not direct time domain I/Q data, but result values (or parameters) learned in part or in whole by the transmitter to the receiver. For example, if an algorithm, such as the Volterra series is used, the coefficients or parameters of the formula constituting the model may be delivered. Alternatively, for example, in the case of NN-based learning, weight values or the number of nodes, a structure, or the like, required for configuration may be delivered. The receiver may collect some learned result values (or parameters) received from the transmitter and learn the rest, or generate an NC model based on all learned result values (or parameters).

In operation S1605, a terminal may transmit an RRC message including UE capability information to the base station. The UE capability information may indicate whether transmission based on an NC operation is supported. In addition, the UE capability information may additionally indicate whether the terminal may perform learning part or all of the NC model. In addition, although not illustrated in this diagram, the base station may transmit information on the range of supported NSIs to the terminal.

In operation S1610, the terminal may perform learning part or all of the NC model internally.

In operation S1615, the base station may request a result of learning the NC model by the terminal. Alternatively, the base station may request a result of learning part of the NC model by the terminal and data necessary for learning the rest of the NC model. For example, if an algorithm, such as the Volterra series is used, the result of learning part or all of the NC model by the terminal may include coefficients or parameters of formulas constituting the NC model. Alternatively, for example, in the case of NN-based learning, the result of learning part or all of the NC model by the terminal may include weight values or the number of nodes, a structure, or the like, required for configuration. Alternatively, for example, in a case where the terminal supports learning part of the NC model, the base station may additionally request data necessary for learning the remaining NC model from the terminal.

In operation S1620, the terminal may transmit a response (or request confirmation) message to the request by the base station to the base station.

In operation S1625, the base station may transmit uplink resource allocation information (e.g., UL grant) for the terminal to transmit the result of learning the NC model to the terminal. Alternatively, the base station may transmit uplink resource allocation information for the terminal to transmit the result of learning part of the NC model by the terminal and data necessary for learning the rest of the NC model. The uplink resource allocation information may be transmitted through DCI. In this case, the amount of uplink resources may be determined according to the range of the NSIs that the UE may support to the base station.

In operation S1630, the terminal may request the result of the learning the NC model by the terminal by using the allocated uplink resources. Alternatively, the terminal may transmit the result of learning part of the NC model by the terminal and data necessary for learning the rest of the NC model by using the allocated uplink resources. The result of the learning the NC model by the terminal or the result of learning part of the NC model by the terminal and data necessary for learning the rest of the NC model may be transmitted through PUSCH. In this case, data necessary for the NC model learning may include time domain I/Q data of the terminal for the entire NSI range supported by the base station.

In operation S1635, the base station may generate and apply the NC model based on the result of learning the NC model by the terminal. Alternatively, the base station may learn (or generate) and apply the NC model based on the result of learning part of the NC model and data necessary for learning the rest of the NC model. Thereafter, the terminal and the base station may transmit and receive uplink data according to the generated NC model.

Among the above-described embodiments and methods, each configuration or step may be selectively combined/mixed and applied. In addition, not all of the steps described above must be included according to configurations and/or definitions on the system, and some steps may be omitted. In FIG. 16, only the case of uplink illustrated, but a similar embodiment corresponding to the case of downlink may be applied to those who have ordinary knowledge in the technical field to which the disclosure belongs. In addition, the time point at which the terminal learns part or all of the NC model is illustrated as operation S1610, but this is only an example for convenience of technology, and the terminal may perform learning in advance at certain time point or may perform learning after receiving a request from the base station.

Figure 17:
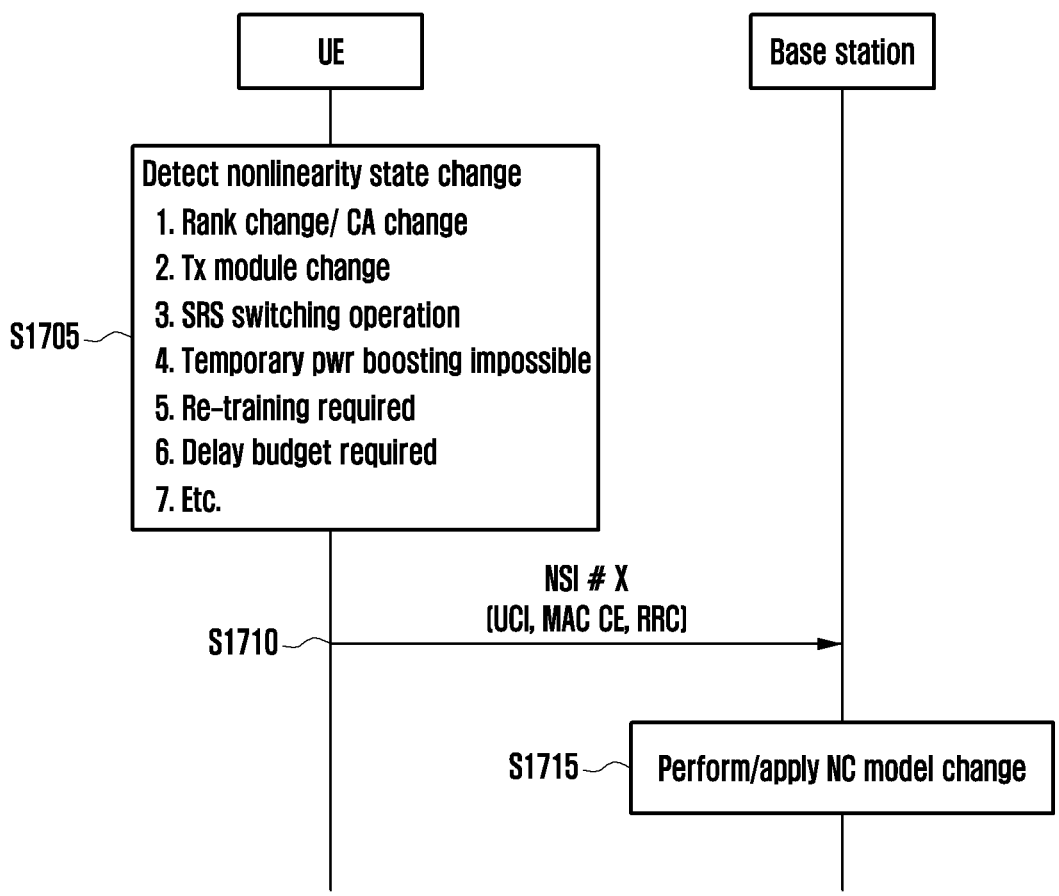
FIG. 17 is a sequence diagram illustrating a procedure for a terminal to transmit nonlinear state information (NSI) after a base station learns an NC model in case of uplink transmission according to an embodiment of the disclosure.

FIG. 17 is a sequence diagram illustrating a procedure for a terminal to transmit NSI after a base station learns an NC model in case of uplink transmission according to an embodiment of the disclosure.

Referring to FIG. 17, in a case where the nonlinearity of the terminal is changed after the base station learns the NC model by using the data (time domain I/Q data of the terminal) necessary for learning the NC model according to the method described above in FIG. 14 or 16, the terminal may allow the base station to change the NC model based on the NSI by providing the base station with the NSI corresponding to the changed nonlinearity.

In operation S1705, the terminal may detect that the nonlinearity of the transmission power of the signal transmitted from the terminal is changed. Factors by which the change in nonlinearity is detected may vary depending on configurations on the network and the development process, design, and implementation of the terminal itself, as described above, and this as described above.

In operation S1710, the terminal may transmit an NSI (e.g., NSI #X) corresponding to the changed nonlinearity to the base station. On the other hand, the signaling method for transmitting the NSI may vary according to the nature of the corresponding nonlinearity change (for example, the frequency or period in which the nonlinearity changes). For example, when the nonlinearity changes quickly, the NSI is transmitted through physical layer control information (e.g. uplink control information (UCI)) or medium access control (MAC) control element (CE), and when the change of nonlinearity has a change frequency of several seconds or more, radio resources may be efficiently used by transmitting the NSI through RRC signaling. An example of a signaling method according to the change frequency of nonlinearity is described in Table 1, but is not limited thereto.

In operation S1715, the base station may change and apply a corresponding NC model according to the NSI received in operation S1710. Thereafter, the terminal and the base station may transmit and receive uplink data according to the NSI. For example, the terminal may expect that the base station compensates for the nonlinearity of the signal transmitted from the terminal by applying the NC model corresponding to the NSI, and transmit uplink data by using greater power. The base station may apply an NC model corresponding to the NSI received from the terminal to compensate for nonlinearity of the terminal and receive uplink data.

Among the above-described embodiments and methods, each configuration or step may be selectively combined/mixed and applied. In addition, not all of the steps described above must be included according to configurations and/or definitions on the system, and some steps may be omitted.

Figure 18:
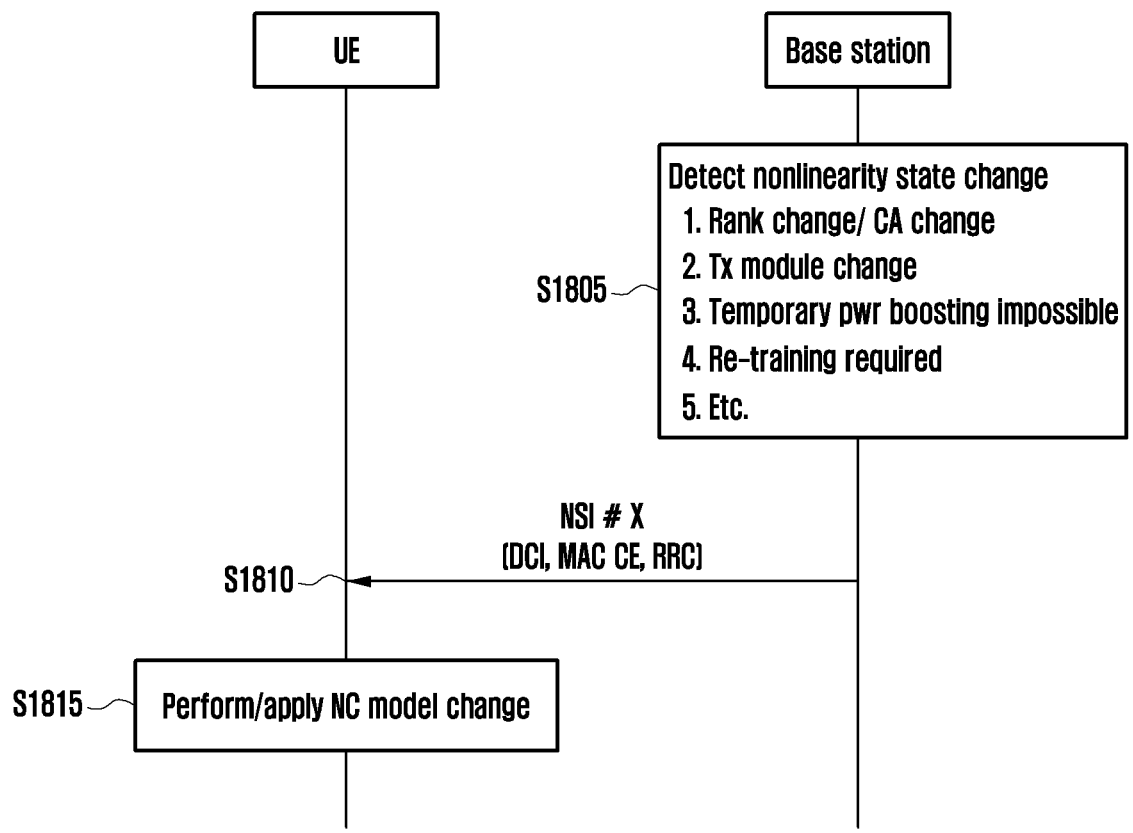
FIG. 18 is a sequence diagram illustrating a procedure for a base station to transmit NSI after a terminal learns an NC model in case of downlink transmission according to an embodiment of the disclosure.

FIG. 18 is a sequence diagram illustrating a procedure for a base station to transmit NSI after a terminal learns an NC model in case of downlink transmission according to an embodiment of the disclosure.

Referring to FIG. 18, when the nonlinearity of the base station is changed after learning the NC model by the terminal by using data (time domain I/Q data of the terminal) necessary for learning the NC model according to the method described above in FIG. 15 or 16, the base station may allow the terminal to change the NC model, based on the NSI by providing the terminal with the NSI corresponding to the changed nonlinearity.

In operation S1805, the base station may detect a change in nonlinearity of transmission power of a signal transmitted from the base station. Factors by which the change in nonlinearity is detected may vary depending on configurations on the network and the development process, design, and implementation of the base station itself, as described above.

In operation S1810, the base station may transmit the NSI (e.g., NSI #X) corresponding to the changed nonlinearity to the terminal. On the other hand, the NSI may have a different signaling method depending on the nature of the nonlinearity change (e.g., the frequency or period in which the nonlinearity changes). For example, when the nonlinearity changes quickly, the NSI may be transmitted through physical layer control information (e.g., downlink control information (DCI)) or MAC CE, and when the change of nonlinearity has a change frequency of several seconds or more, radio resources may be efficiently used by transmitting the NSI through RRC signaling. An example of a signaling method according to the change frequency of nonlinearity is described in Table 1, but is not limited thereto.

In operation S1815, the terminal may change and apply a corresponding NC model according to the NSI received in operation S1810. Thereafter, the terminal and the base station may transmit and receive downlink data according to the NSI. For example, the base station may transmit downlink data by using greater power, expecting that the terminal will compensate for nonlinearity of a signal transmitted from the base station by applying an NC model corresponding to the NSI. The terminal may apply an NC model corresponding to the NSI received from the base station to compensate for nonlinearity of the base station and receive downlink data.

Among the above-described embodiments and methods, each configuration or step may be selectively combined/mixed and applied. In addition, not all of the steps described above must be included according to configurations and/or definitions on the system, and some steps may be omitted.

On the other hand, according to an embodiment of the disclosure, the receiver may learn the NC model through a reference signal (RS) transmitted from the transmitter. The RS may include, for example, DMRS, CSI-RS, SRS, or PT-RS. In the case of RS, because it is transmitted based on RS configuration information known to the transmitter and the receiver in advance, the receiver may know the Tx input data of the transmitter, and when the channel effect is removed from the received RS through a channel equalizer and IQ data is generated, the Tx output data of the transmitter may be known. The transmitter may transmit the NSI related to the RS together with the RS, and this is to prevent a situation in which an error occurs by using the NC model learned by the receiver through the RS as it is in a case in which the nonlinearity of the transmitter when the RS is transmitted is different from the nonlinearity when other signals are transmitted thereafter. When the receiver receiving the RS and the NSI learns the NC model, and when a change in nonlinearity occurs in the transmitter, the transmitter may transmit the NSI and the RS according to the changed nonlinearity to the receiver, thereby inducing the receiver to change the NC model.

As the nonlinearity changes, there may be a difference between the time point of transmitting the NSI and the time point of transmitting the RS. In order to minimize the error caused by this difference, it is necessary to select an appropriate signaling method. In the case of assumptions in a general environment, it is natural to learn or apply the changed NC model from the frame, subframe or slot in which the NSI is transmitted, but it is also possible that the receiver that first receives the RS learns the NC model, based on the RS, then receives the NSI and applies the learned NC model to the corresponding NSI. According to an embodiment of the disclosure, a signaling method for transmitting the NSI may vary according to the nature of the nonlinearity change (e.g., the frequency or period in which the nonlinearity changes). For example, when nonlinearity changes rapidly, the NSI is transmitted through physical layer control information (e.g., DCI or UCI) or MAC CE, and when the change of nonlinearity has a change frequency of several seconds or more, radio resources are efficiently used by transmitting the NSI through RRC signaling. An example of a signaling method according to the change frequency of nonlinearity is described in Table 1, but is not limited thereto.

Hereinafter, a specific method of establishing an NC model by using a reference signal required for NC model learning will be described.

Figure 19:
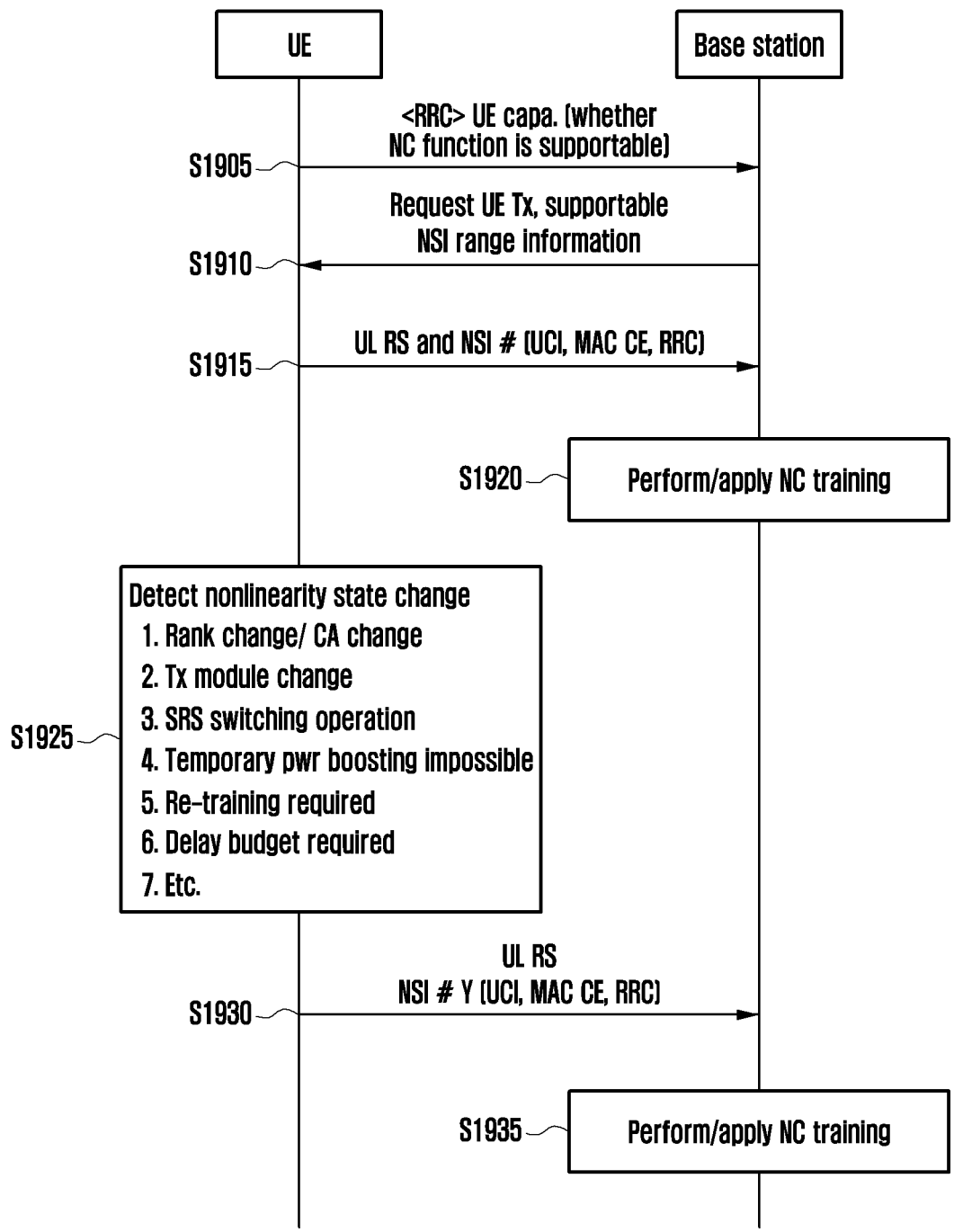
FIG. 19 is a sequence diagram illustrating a procedure for a base station to establish an NC model by using a reference signal necessary for NC model learning in case of uplink transmission according to an embodiment of the disclosure.

FIG. 19 is a sequence diagram illustrating a procedure for a base station to establish an NC model by using a reference signal necessary for NC model learning in case of uplink transmission according to an embodiment of the disclosure.

Referring to FIG. 19, in operation S1905, the terminal may transmit an RRC message including UE capability information to the base station. The UE capability information may indicate whether transmission based on an NC operation is supported.

In operation S1910, the base station may request the RS required for learning the NC model from the terminal. Alternatively, the base station may transmit configuration information for the RS to the base station. In this case, the base station may transmit information on the range of supported NSI together. The RS request (or RS configuration information) and NSI range information may be transmitted together in the same message or may be transmitted separately.

In operation S1915, the terminal may transmit the NSI (e.g., NSI #X) related to the RS together with the RS. The NSI may be transmitted through a UCI, MAC CE, RRC message, or a combination thereof according to the frequency or period in which the nonlinearity is changed. In this case, the message or information through which the NSI is transmitted may include information indicating a related RS (e.g., RS resource index, or the like).

In operation S1920, the base station may learn (or generate) and apply an NC model corresponding to the corresponding NSI (e.g., NSI #X), based on the received RS. The NC model may be generated either based on equations or based on AI. Thereafter, the terminal and the base station may transmit and receive uplink data according to the generated NC model.

In operation S1925, the terminal may detect a change in nonlinearity of the transmission power of the signal transmitted from the terminal is changed. Factors by which the change in nonlinearity is detected may vary depending on configurations on the network and the development process, design, and implementation of the terminal itself, as described above.

In operation S1930, the terminal may transmit the NSI (e.g., NSI #Y) corresponding to the changed nonlinearity to the base station. In this case, similarly, the terminal may transmit an RS necessary for learning the NC model to be changed, and the corresponding NSI (e.g., NSI #Y) may be related to the RS. The NSI may be transmitted through a UCI, MAC CE, RRC message, or a combination thereof according to the frequency or period in which the nonlinearity is changed. In this case, the message or information through which the NSI is transmitted may include information indicating a related RS (e.g., RS resource index, or the like).

In operation S1935, the base station may learn (or generate) and apply an NC model corresponding to the corresponding NSI (e.g., NSI #Y), based on the received RS. The NC model may be generated either based on equations or based on AI. Thereafter, the terminal and the base station may transmit and receive uplink data according to the generated NC model.

Among the above-described embodiments and methods, each configuration or step may be selectively combined/mixed and applied. In addition, not all of the steps described above must be included according to configurations and/or definitions on the system, and some steps may be omitted.

Figure 20:
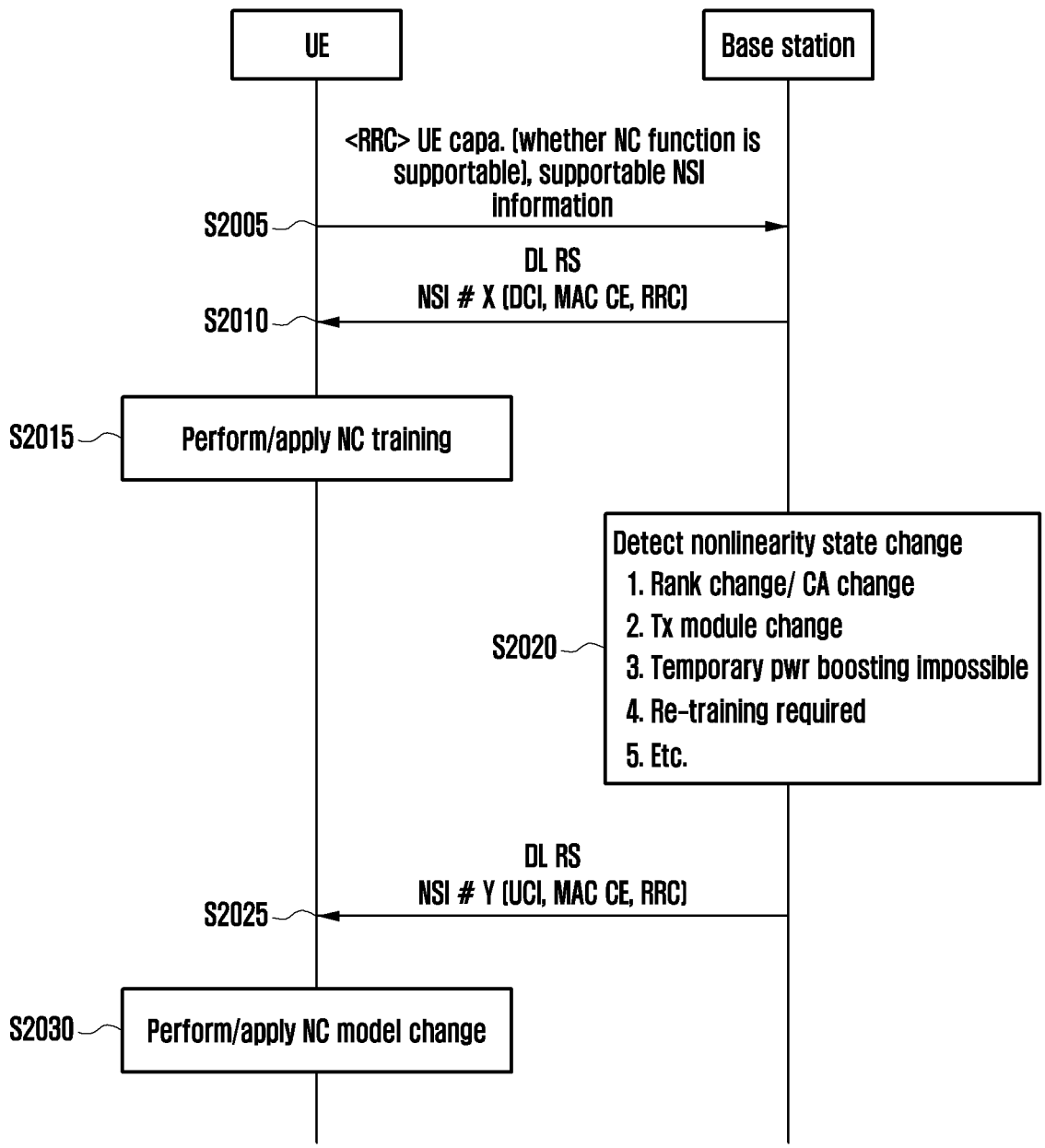
FIG. 20 is a sequence diagram illustrating a procedure for a terminal to establish an NC model by using a reference signal necessary for NC model learning in case of downlink transmission according to an embodiment of the disclosure.

FIG. 20 is a sequence diagram illustrating a procedure for a terminal to establish an NC model by using a reference signal necessary for NC model learning in case of downlink transmission according to an embodiment of the disclosure.

Referring to FIG. 20, in operation S2005, the terminal may transmit an RRC message including UE capability information to the base station. The UE capability information may indicate whether transmission based on an NC operation is supported. In addition, the UE capability information may indicate a range of supported NSIs. Information on the range of supported NSIs may be included in the UE capability information or may be configured as separate information.

In operation S2010, the base station may transmit the NSI (e.g., NSI #X) related to the RS together with an RS required for NC model learning. The NSI may be transmitted through a DCI, MAC CE, RRC message, or a combination thereof according to the frequency or period in which the nonlinearity is changed. In this case, the message or information through which the NSI is transmitted may include information indicating a related RS (e.g., RS resource index, or the like).

In operation S2015, the terminal may learn (or generate) and apply an NC model corresponding to the corresponding NSI (e.g., NSI #X) based on the received RS. The NC model may be generated either based on equations or based on AI. Thereafter, the terminal and the base station may transmit and receive downlink data according to the generated NC model.

In operation S2020, the base station may detect a change in nonlinearity of the transmission power of the signal transmitted from the base station. Factors by which the change in nonlinearity is detected may vary depending on configurations on the network and the development process, design, and implementation of the base station itself, as described above.

In operation S2025, the base station may transmit the NSI (e.g., NSI #Y) corresponding to the changed nonlinearity to the terminal. In this case, similarly, the base station may transmit an RS necessary for learning the NC model to be changed, and the corresponding NSI (e.g., NSI #Y) may be related to the RS. The NSI may be transmitted through a DCI, MAC CE, RRC message, or a combination thereof according to the frequency or period in which the nonlinearity is changed. In this case, the message or information through which the NSI is transmitted may include information indicating a related RS (e.g., RS resource index, or the like).

In operation S2030, the terminal may learn (or generate) and apply an NC model corresponding to the corresponding NSI (e.g., NSI #Y), based on the received RS. The NC model may be generated either based on equations or based on AI. Thereafter, the terminal and the base station may transmit and receive downlink data according to the generated NC model.

Among the above-described embodiments and methods, each configuration or step may be selectively combined/ mixed and applied. In addition, not all of the steps described above must be included according to configurations and/or definitions on the system, and some steps may be omitted.

Hereinafter, detailed procedures according to a signaling method for transmitting NSI from a transmitter to a receiver will be described.

Figure 21:
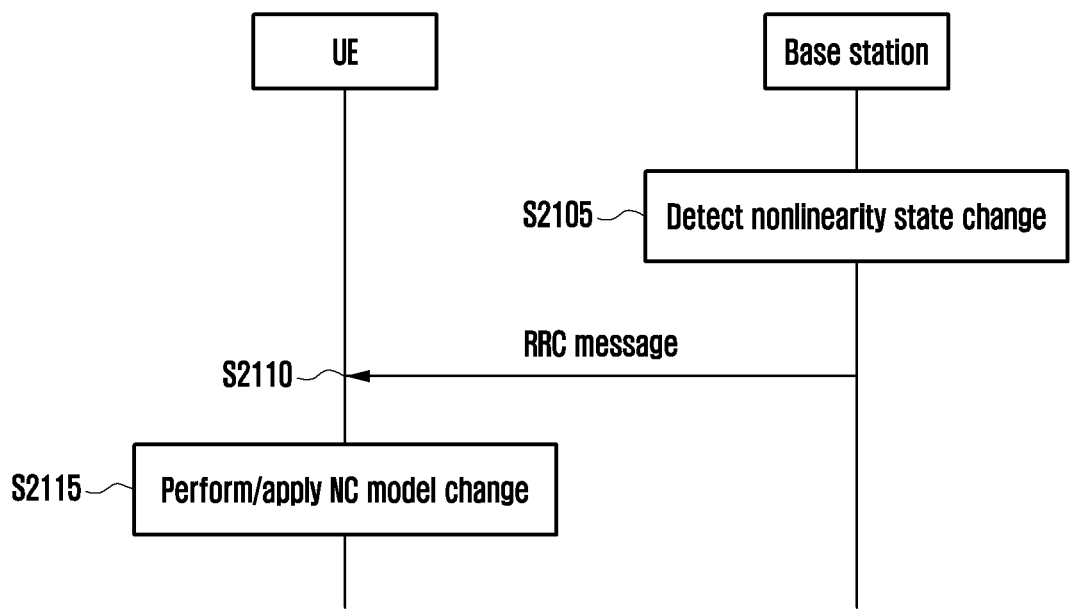
FIG. 21 is a sequence diagram illustrating a procedure for a base station to transmit NSI through a radio resource control (RRC) message in case of downlink transmission according to an embodiment of the disclosure.

FIG. 21 is a sequence diagram illustrating a procedure for a base station to transmit NSI through an RRC message in case of downlink transmission according to an embodiment of the disclosure.

Referring to FIG. 21, in operation S2105, the base station may detect a change in nonlinearity of the transmission power of the signal transmitted from the base station. Factors by which the change in nonlinearity is detected may vary depending on configurations on the network and the development process, design, and implementation of the base station itself, as described above.

In operation S2110, the base station may transmit an RRC message including information on NSI (e.g., NSI #X) corresponding to the changed nonlinearity to the terminal.

In operation S2115, the terminal may change to an NC model corresponding to the NSI (e.g., NSI #X) included in the received RRC message and apply the same. Thereafter, the terminal and the base station may transmit and receive downlink data according to the changed NC model.

Among the above-described embodiments and methods, each configuration or step may be selectively combined/ mixed and applied. In addition, not all of the steps described above must be included according to configurations and/or definitions on the system, and some steps may be omitted.

Figure 22:
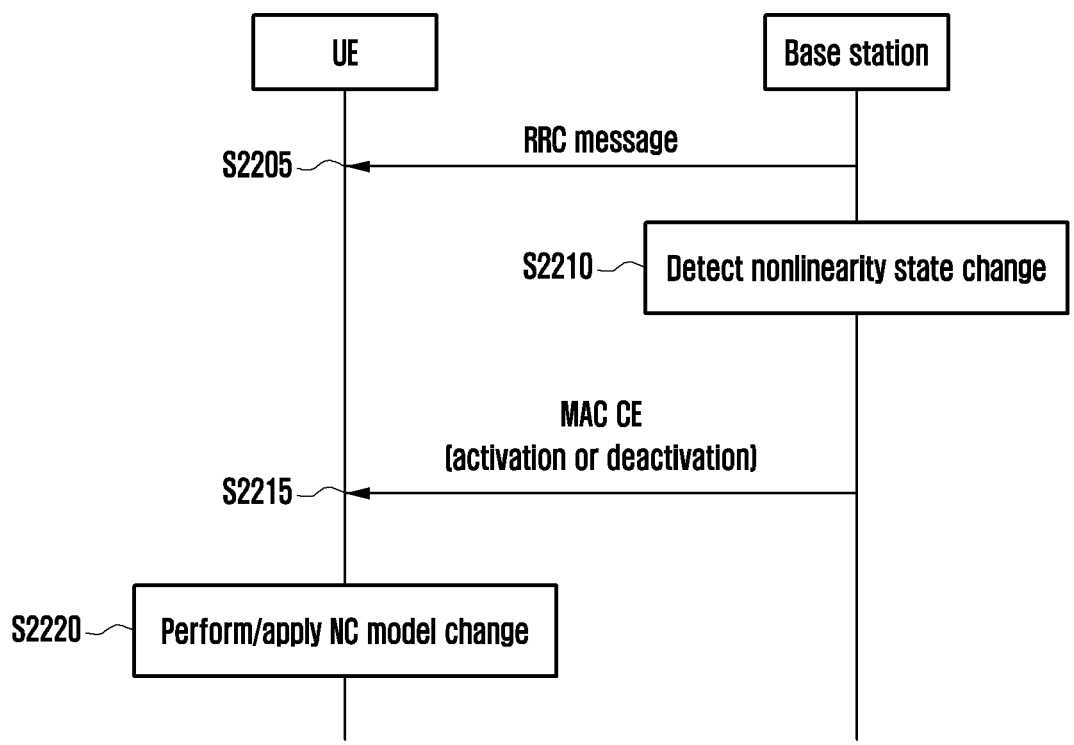
FIG. 22 is a sequence diagram illustrating a procedure for a base station to transmit NSI through medium access control (MAC) control element (CE) in case of downlink transmission according to an embodiment of the disclosure.

FIG. 22 is a sequence diagram illustrating a procedure for a base station to transmit NSI through MAC CE in case of downlink transmission according to an embodiment of the disclosure.

Referring to FIG. 22, in operation S2205, the base station may transmit an RRC message including information on NSI to the terminal. For example, the RRC message may include mapping information that allows the base station to indicate activation or deactivation of a specific NSI through MAC CE in the range of NSIs that may be supported by the terminal.

In operation S2210, the base station may detect a change in nonlinearity of the transmission power of the signal transmitted from the base station. Factors by which the change in nonlinearity is detected may vary depending on configurations on the network and the development process, design, and implementation of the base station itself, as described above.

In operation S2215, the base station may transmit a MAC CE including a field indicating activation or deactivation of the NSI (e.g., NSI #X) corresponding to the changed nonlinearity to the terminal.

In operation S2220, if the MAC CE indicates activation of NSI (e.g., NSI #X), the terminal may change to an NC model corresponding to NSI (e.g., NSI #X) and apply the same. Thereafter, the terminal and the base station may transmit and receive downlink data according to the changed NC model.

Among the above-described embodiments and methods, each configuration or step may be selectively combined/ mixed and applied. In addition, not all of the steps described above must be included according to configurations and/or definitions on the system, and some steps may be omitted.

Figure 23:
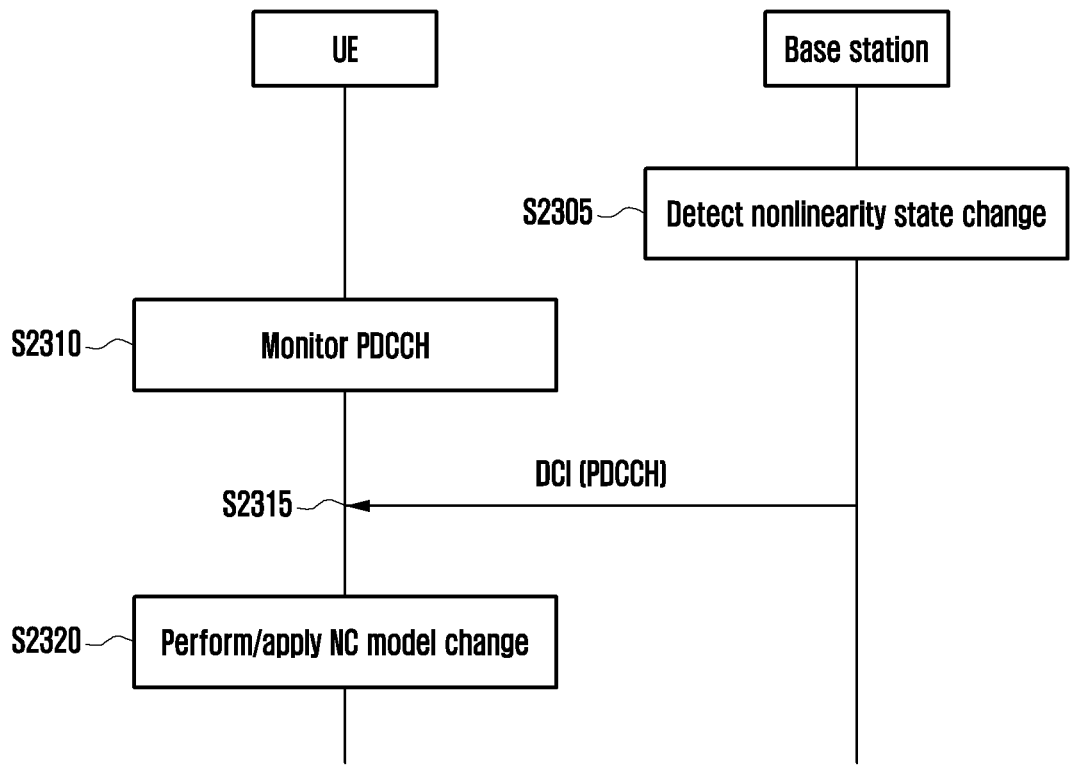
FIG. 23 is a sequence diagram illustrating a procedure for a base station to transmit NSI through downlink control information (DCI) in case of downlink transmission according to an embodiment of the disclosure.

FIG. 23 is a sequence diagram illustrating a procedure for a base station to transmit NSI through DCI in case of downlink transmission according to an embodiment of the disclosure.

Referring to FIG. 23, in operation S2305, the base station may detect a change in nonlinearity of the transmission power of the signal transmitted from the base station. Factors by which the change in nonlinearity is detected may vary depending on configurations on the network and the development process, design, and implementation of the base station itself, as described above.

In operation S2310, the terminal may monitor a physical downlink control channel (PDCCH) to decode the DCI to be transmitted from the base station.

In operation S2315, the base station may transmit a DCI message including a field for NSI (e.g., NSI #X) corresponding to the changed nonlinearity to the terminal through the PDCCH.

In operation S2320, the terminal may change to an NC model corresponding to the NSI (e.g., NSI #X) included in the received DCI and apply the same. Thereafter, the terminal and the base station may transmit and receive downlink data according to the changed NC model.

Among the above-described embodiments and methods, each configuration or step may be selectively combined/ mixed and applied. In addition, not all of the steps described above must be included according to configurations and/or definitions on the system, and some steps may be omitted.

Figure 24:
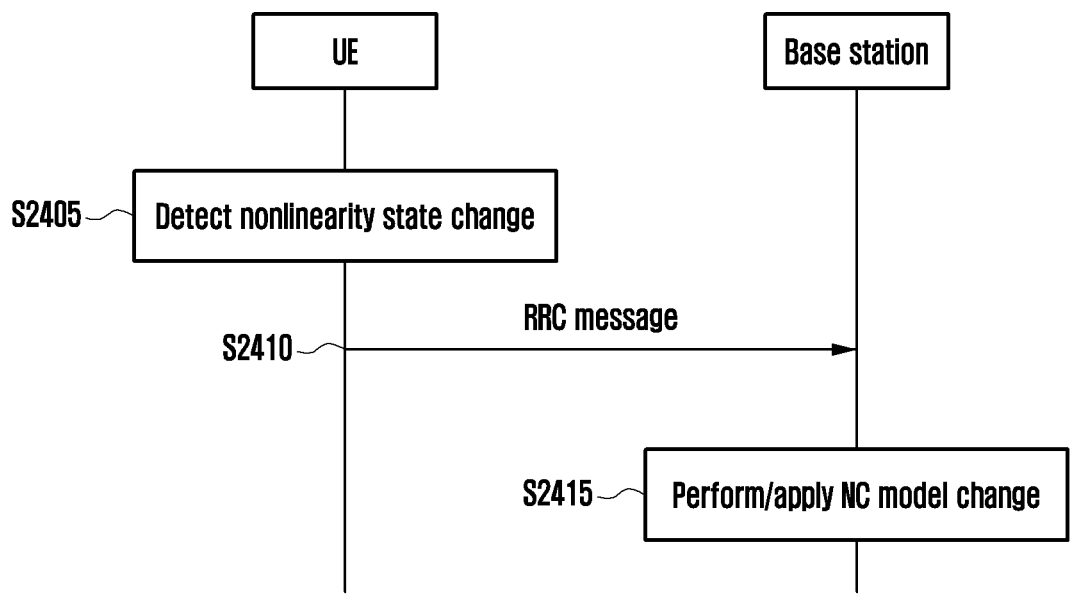
FIG. 24 is a sequence diagram illustrating a procedure for a terminal to transmit NSI through an RRC message in case of uplink transmission according to an embodiment of the disclosure.

FIG. 24 is a sequence diagram illustrating a procedure for a terminal to transmit NSI through an RRC message in case of uplink transmission according to an embodiment of the disclosure.

Referring to FIG. 24, in operation S2405, the terminal may detect a change in nonlinearity of the transmission power of the signal transmitted from the terminal is changed. Factors by which the change in nonlinearity is detected may vary depending on configurations on the network and the development process, design, and implementation of the terminal itself, as described above.

In operation S2410, the terminal may transmit an RRC message including information on NSI (e.g., NST #X) corresponding to the changed linearity to a base station.

In operation S2415, the base station may change to an NC model corresponding to the NSI (e.g., NSI #X) included in the received RRC message and apply the same. Thereafter, the terminal and the base station may transmit and receive uplink data according to the changed NC model.

Among the above-described embodiments and methods, each configuration or step may be selectively combined/ mixed and applied. In addition, not all of the steps described above must be included according to configurations and/or definitions on the system, and some steps may be omitted.

Figure 25:
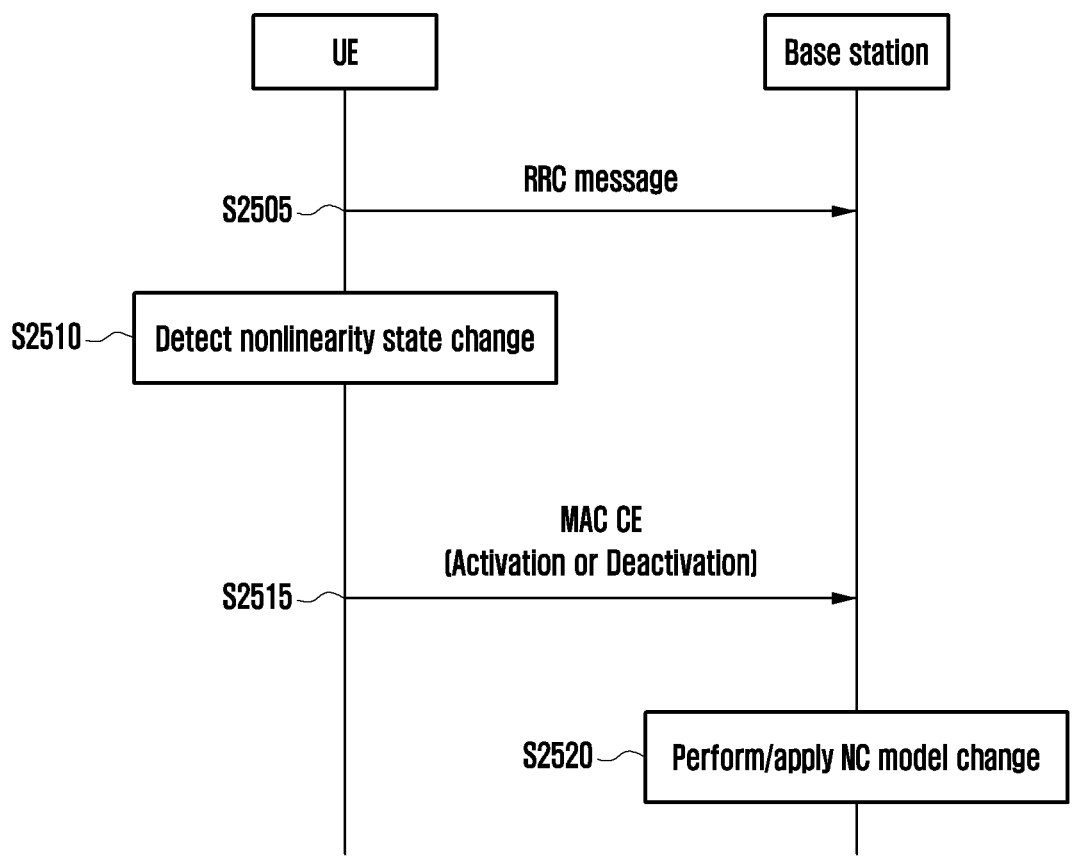
FIG. 25 is a sequence diagram illustrating a procedure for a terminal to transmit NSI through MAC CE in case of uplink transmission according to an embodiment of the disclosure.

FIG. 25 is a sequence diagram illustrating a procedure for a terminal to transmit NSI through MAC CE in case of uplink transmission according to an embodiment of the disclosure.

Referring to FIG. 25, in operation S2505, the terminal may transmit an RRC message including information on NSI to a base station. For example, the RRC message may include mapping information that allows the terminal to indicate activation or deactivation of a specific NSI through MAC CE in the range of NSIs that may be supported by the base station.

In operation S2510, the terminal may detect a change in nonlinearity of the transmission power of the signal transmitted from the terminal. Factors by which the change in nonlinearity is detected may vary depending on configurations on the network and the development process, design, and implementation of the terminal itself, as described above.

In operation S2515, the terminal may transmit a MAC CE including a field indicating activation or deactivation of the NSI (e.g., NSI #X) corresponding to the changed nonlinearity to the base station.

In operation S2220, if the MAC CE indicates activation of NSI (e.g., NSI #X), the base station may change to an NC model corresponding to NSI (e.g., NSI #X) and apply the same. Thereafter, the terminal and the base station may transmit and receive uplink data according to the changed NC model.

Among the above-described embodiments and methods, each configuration or step may be selectively combined/mixed and applied. In addition, not all of the steps described above must be included according to configurations and/or definitions on the system, and some steps may be omitted.

Figure 26:
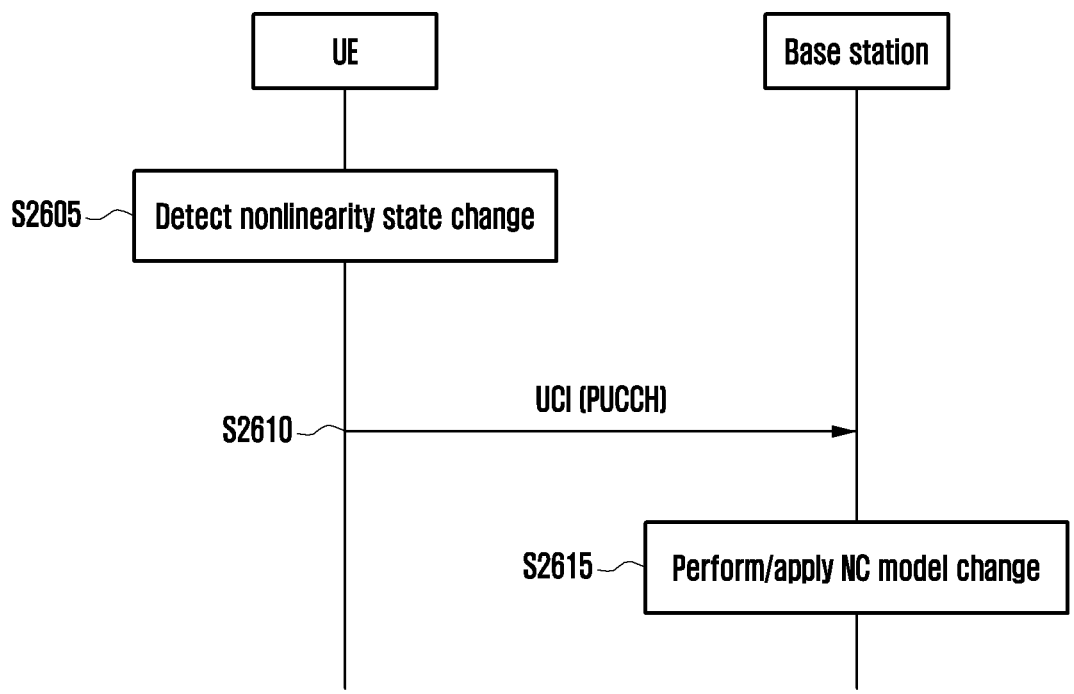
FIG. 26 is a sequence diagram illustrating a procedure for a terminal to transmit NSI through uplink control information (UCI) in case of uplink transmission according to an embodiment of the disclosure.

FIG. 26 is a sequence diagram illustrating a procedure for a terminal to transmit NSI through UCI in case of uplink transmission according to an embodiment of the disclosure.

Referring to FIG. 26, in operation S2605, the terminal may detect a change in nonlinearity of the transmission power of the signal transmitted from the terminal. Factors by which the change in nonlinearity is detected may vary depending on configurations on the network and the development process, design, and implementation of the terminal itself, as described above.

In operation S2610, the terminal may transmit a UCI message including a field for NSI (e.g., NSI #X) corresponding to the changed nonlinearity to the base station through a physical uplink control channel (PUCCH).

In operation S2615, the base station may change to an NC model corresponding to the NSI (e.g., NSI #X) included in the received UCI and apply the same. Thereafter, the terminal and the base station may transmit and receive uplink data according to the changed NC model.

Among the above-described embodiments and methods, each configuration or step may be selectively combined/mixed and applied. In addition, not all of the steps described above must be included according to configurations and/or definitions on the system, and some steps may be omitted.

On the other hand, because the NSI indirectly informs the internal circumstances of the transmitter, the NSI will be determined through internal configurations and algorithms. However, when the base station is the receiver (i.e., in the case of uplink), because the base station directly determines and transmits the communication configuration to the terminal, if the same NSI is repeatedly received from the terminal according to the same configuration as the previous configuration, the base station may be able to predict the NSI to be received from the terminal by changing the nonlinearity according to the configuration. In addition, even when the terminal is a receiver (i.e., downlink), if the same NSI is repeatedly received from the same base station according to the same configuration as the previous configuration, the terminal may be able to predict the NSI to be received from the base station by changing the nonlinearity according to the configuration. Accordingly, in the disclosure, there is proposed a method in which when a specific timer (e.g., NSI timer) is operated and the same configuration is repeated while the timer is running, the receiver changes and applies the NC model without receiving NSI from the transmitter, and after the timer expires, the receiver receives NSI from the transmitter again. Through this, there is an effect that radio resources for unnecessary repeated NSI transmission may be saved.

Figure 27:
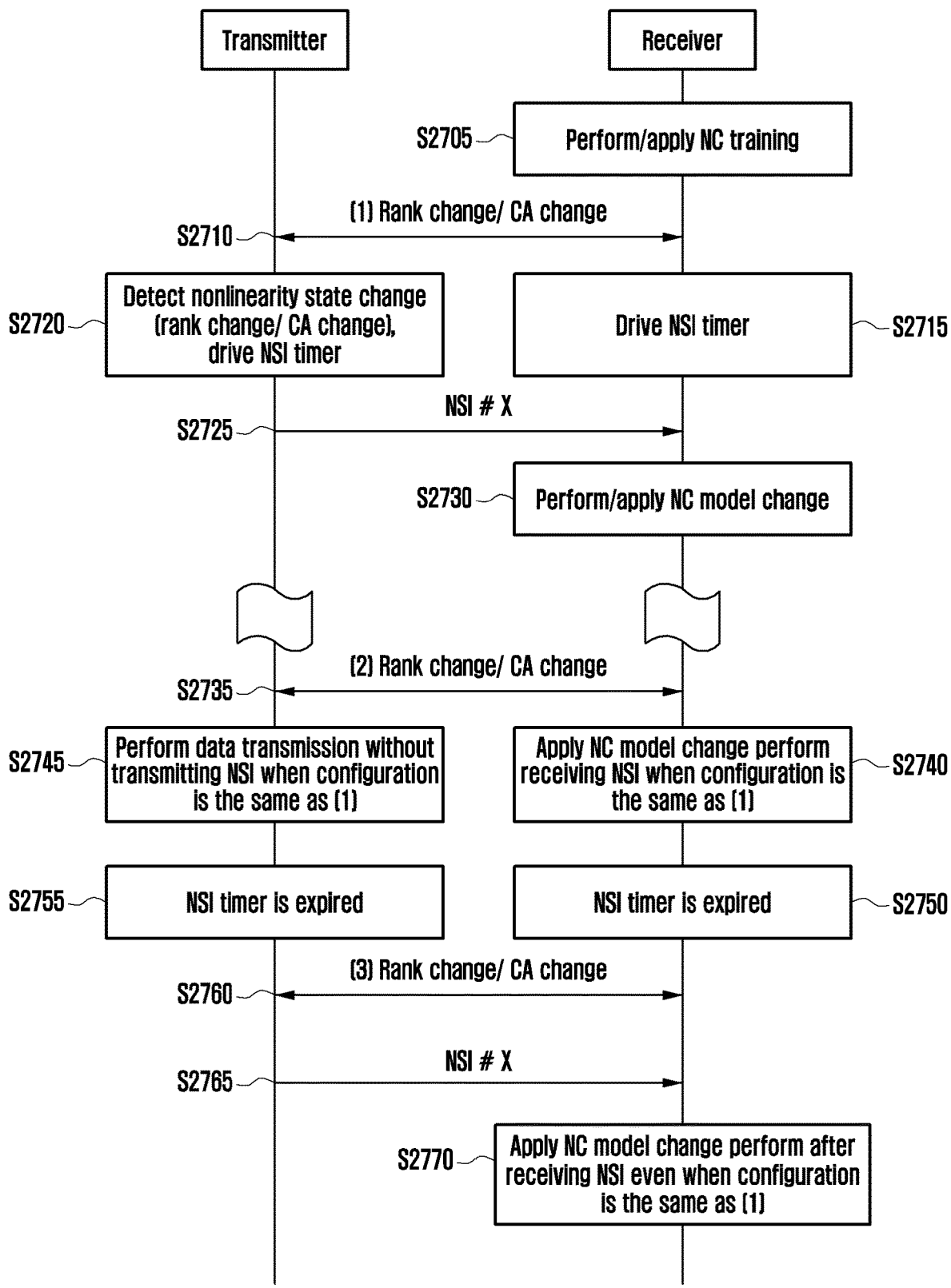
FIG. 27 is a sequence diagram illustrating a procedure of predicting and applying NSI through repeated configurations according to an embodiment of the disclosure.

FIG. 27 is a sequence diagram illustrating a procedure of predicting and applying NSI through repeated configurations according to an embodiment of the disclosure.

Referring to FIG. 27, in operation S2705, the receiver may learn the NC model and transmit/receive data with the transmitter by using the learned NC model.

In operation S2710, the transmitter and the receiver may change network configurations. For example, the base station may transmit an RRC message (e.g., RRC reconfiguration) including the configuration information to the terminal, and the terminal may transmit a response message (e.g., RRC reconfiguration complete) to the RRC message to the base station. Through this, in MIMO transmission, a rank value may be changed or a CA configuration may be changed.

In operations S2715 to S2720, the receiver may drive the NSI timer. In addition, as the transmitter applies the changed network configuration, the transmitter may detect a change in nonlinearity of the power of the transmitted signal and drive the same NSI timer. The NSI timer value may be preset or determined as a fixed value on the network.

For example, in a case where the base station is the receiver and the terminal is the transmitter (i.e., in the case of uplink), the base station may drive the NSI timer after transmitting the RRC message (or after receiving a response message from the terminal). On the other hand, the terminal may apply the configuration information included in the RRC message received in operation S2710 and detect a change in the nonlinearity of the terminal. In addition, the terminal detecting the change in the nonlinearity may drive the NSI timer. For another example, when the terminal is the receiver and the base station is the transmitter (i.e., downlink), the base station may detect that the nonlinearity of the base station is changed by applying the network configuration determined by the base station. In addition, the base station detecting the change in nonlinearity may drive the NSI timer value. On the other hand, the terminal may drive the NSI timer after receiving the RRC message from the base station (or after transmitting the response message to the base station).

In operation S2725, the transmitter may transmit NSI (e.g., NSI #X) corresponding to the change in the nonlinearity to the receiver. For example, in a case where the base station is the receiver and the terminal is the transmitter (i.e., in the case of uplink), the terminal may transmit NSI to the base station through UCI, MAC CE, or RRC signaling according to the frequency of nonlinearity change. For another example, in a case where the terminal is the receiver and the base station is the transmitter (i.e., in the case of downlink), the base station may transmit NSI to the terminal through DCI, MAC CE, or RRC signaling according to the frequency at which the nonlinearity changes.

In operation S2730, the receiver may change to an NC model corresponding to NSI (e.g., NSI #X) and apply the same. For example, in a case where the base station is the receiver and the terminal is the transmitter (i.e., in the case of uplink), the base station may change to an NC model corresponding to the NSI received from the terminal, and the terminal and the base station may transmit and receive uplink data according to the changed NC model. For another example, in a case where the terminal is the receiver and the base station is the transmitter (i.e., in the case of downlink), the terminal may change to an NC model corresponding to the NSI received from the base station, and the terminal and the base station may transmit and receive downlink data according to the changed NC model.

In operation S2735, the transmitter and the receiver may change network configurations, and the method described in operation S2710 may be applied in the same way.

In operations S2740 to S2745, if the NSI timer is running, the network configurations of operation S2735 are the same as those of operation S2710, and there is no change in the internal nonlinearity of the transmitter according to the network configurations, so the NSI is the same as the previously transmitted NSI (e.g., NSI #X), the transmitter may perform data transmission without transmitting the corresponding NSI. In addition, if the network configurations of operation S2735 are the same as those of operation S2710 and the NSI timer is running, it may be expected that the same NSI (e.g., NSI #X) as the NSI received in operation S2725 may be applied without receiving the NSI from the transmitter. Accordingly, the receiver may change the NC model to an NC model corresponding to the same NSI (e.g., NSI #X) as the NSI received in operation S2725 without receiving the NSI from the transmitter and apply the same. On the other hand, if it is different from the previously transmitted NSI due to the occurrence of internal nonlinearity change of the transmitter even if the NSI timer is running and has not yet expired, the transmitter may transmit the corresponding NSI (e.g., NSI #Y) to the receiver.

In operations S2750 to S2755, NSI timers may expire at the transmitter and the receiver. Thereafter, in operations S2760 to S2770, the methods described in S2710 to S2730 may be applied in the same manner. In this case, because the NSI timer has expired even if the network configurations of operation S2760 are the same as those of operation S2710, when the nonlinearity of the transmitter is changed according to network configurations, the transmitter may transmit NSI (e.g., NSI #X) corresponding to the changed nonlinearity. In addition, after receiving a new NSI (e.g., NSI #X), the receiver may change to an NC model corresponding to the corresponding NSI and apply the same.

Among the above-described embodiments and methods, each configuration or step may be selectively combined/mixed and applied. In addition, not all of the steps described above must be included according to configurations and/or definitions on the system, and some steps may be omitted.

Figure 28:
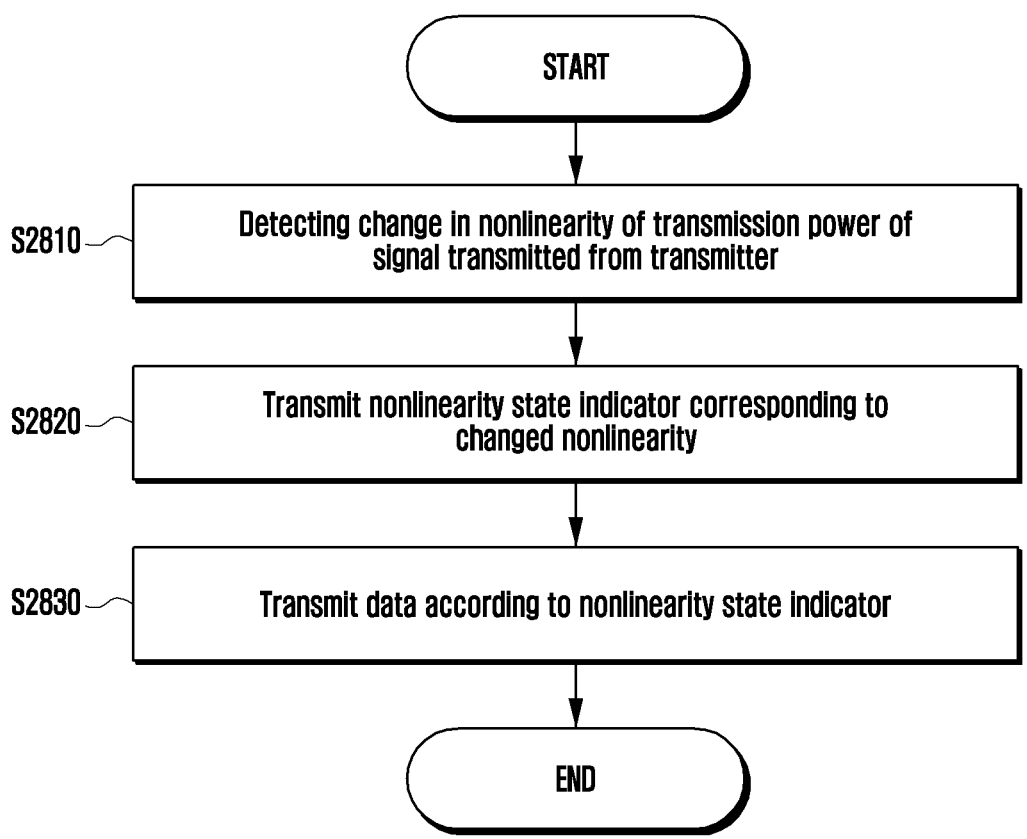
FIG. 28 is a flowchart illustrating operations of a transmitter according to an embodiment of the disclosure.

FIG. 28 is a flowchart illustrating operations of a transmitter according to an embodiment of the disclosure.

Referring to FIG. 28, hereinafter, in the case of downlink, the transmitter may refer to a base station and the receiver may refer to a terminal, and in the case of uplink, the transmitter may refer to a terminal and the receiver may refer to a base station. Referring to FIG. 28, the overall operation of the transmitter according to the embodiment proposed by the disclosure may be applied.

In operation S2810, the transmitter may detect a change in the nonlinearity of the transmission power of the signal transmitted from the transmitter.

In operation S2820, the transmitter may transmit a nonlinearity state indicator (e.g., NSI) corresponding to the changed nonlinearity to the receiver.

In operation S2830, the transmitter may transmit data to the receiver according to the nonlinearity state indicator.

Figure 29:
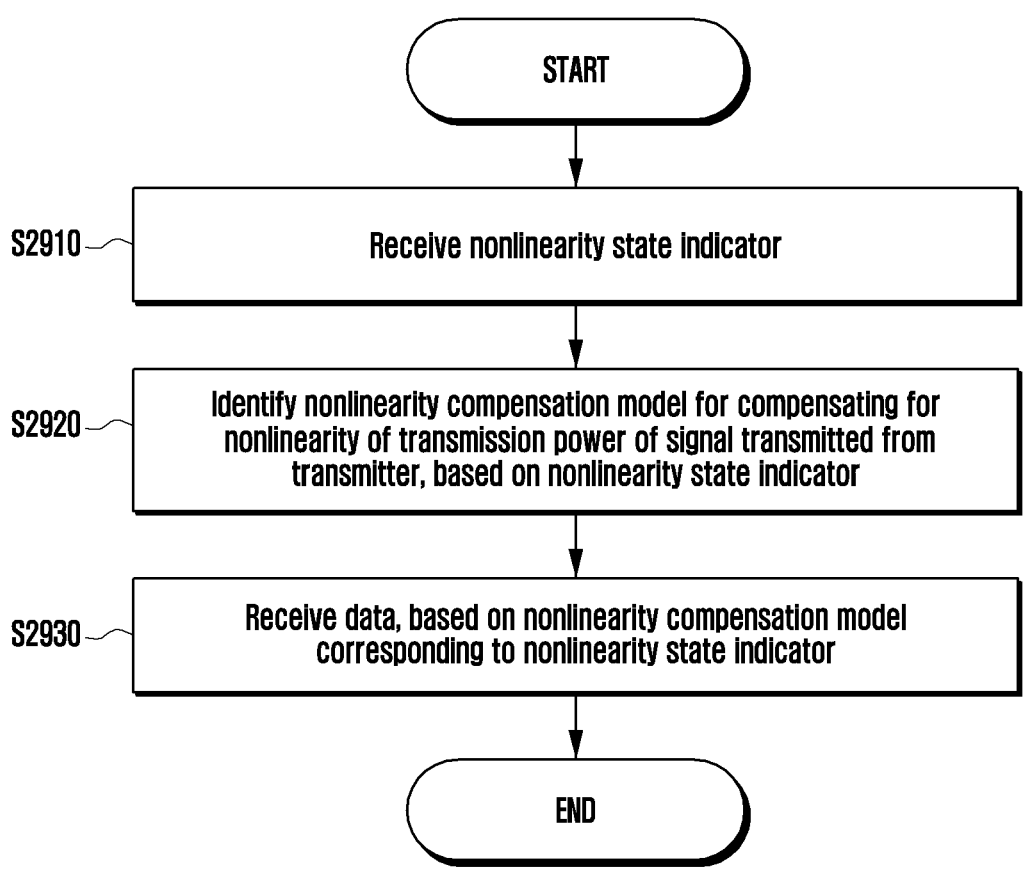
FIG. 29 is a flowchart illustrating operations of a receiver according to an embodiment of the disclosure.

FIG. 29 is a flowchart illustrating operations of a receiver according to an embodiment of the disclosure.

Referring to FIG. 29, hereinafter, in the case of downlink, the transmitter may refer to a base station and the receiver may refer to a terminal, and in the case of uplink, the transmitter may refer to a terminal and the receiver may refer to a base station. Referring to FIG. 29, the overall operation of the receiver according to the embodiment proposed by the disclosure may be applied.

In operation S2910, the receiver may receive a nonlinearity state indicator (e.g., NSI) from the transmitter.

In operation S2920, the receiver may identify a nonlinearity compensation model for compensating nonlinearity of the transmission power of the signal transmitted from the transmitter based on the nonlinearity state indicator.

In operation S2930, the receiver may receive data from the transmitter, based on the nonlinearity compensation model corresponding to the nonlinearity state indicator.

Figure 30:
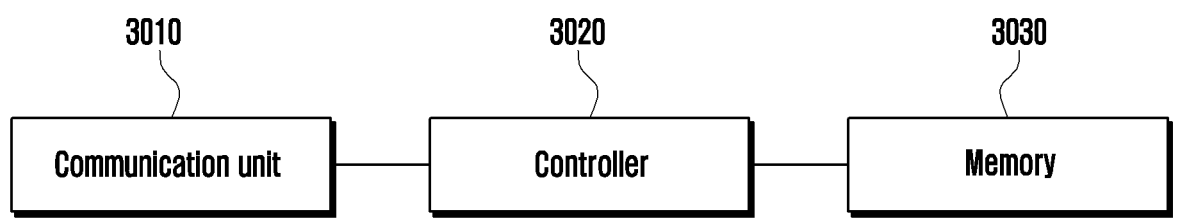
FIG. 30 is a diagram illustrating a structure of a transmitter according to an embodiment of the disclosure.

FIG. 30 is a diagram illustrating a structure of a transmitter according to an embodiment of the disclosure.

Referring to FIG. 30, hereinafter, in the case of downlink, a transmitter (or a first entity) may refer to a base station and a receiver (or a second entity) may refer to a terminal, and in the case of uplink, the transmitter may refer to a terminal and the receiver may refer to a base station. Referring to FIG. 30, the transmitter may include a communication unit (or a transceiver) 3010, a controller 3020, and a memory 3030. In the disclosure, the controller may be defined as a circuit or an application-specific integrated circuit or at least one processor.

The communication unit 3010 may transmit/receive signals with other network entities. For example, the communication unit 3010 may transmit and receive data, control signals, reference signals, and the like to and from a receiver.

The controller 3020 may control the overall operation of the transmitter according to the embodiment proposed by the disclosure. For example, the controller 3020 may control signal flow between blocks to perform an operation according to the flowchart described above. Specifically, the controller 3020 may detect a change in nonlinearity of the transmission power of the signal transmitted from the transmitter, control the communication unit to transmit a nonlinearity state indicator corresponding to the changed nonlinearity to the receiver, and control the communication unit to transmit data to the receiving terminal according to the nonlinearity state indicator.

The memory 3030 may store at least one of information transmitted and received through the communication unit 3010 and information generated through the controller 3020.

Figure 31:
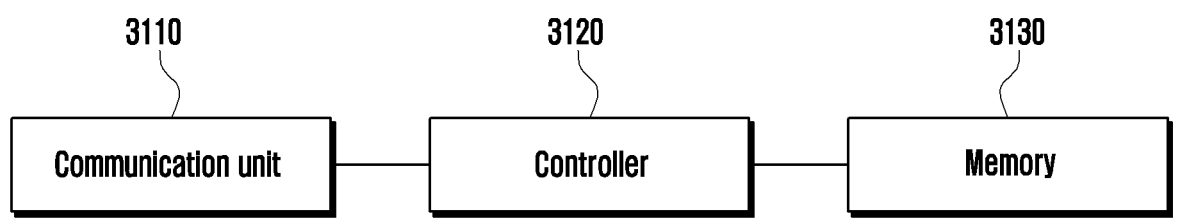
FIG. 31 is a diagram illustrating a structure of a receiver according to an embodiment of the disclosure.

FIG. 31 is a diagram illustrating a structure of a receiver according to an embodiment of the disclosure.

Referring to FIG. 31, hereinafter, in the case of downlink, the transmitter may refer to a base station and the receiver may refer to a terminal, and in the case of uplink, the transmitter may refer to a terminal and the receiver may refer to a base station. Referring to FIG. 31, the receiver may include a communication unit 3110, a controller 3120, and a memory 3130. In the disclosure, the controller may be defined as a circuit or an application-specific integrated circuit or at least one processor.

The communication unit 3110 may transmit/receive signals with other network entities. For example, the communication unit 3110 may transmit and receive data, control signals, reference signals, and the like to and from the transmitter.

The controller 3120 may control the overall operation of the receiver according to the embodiment proposed by the disclosure. For example, the controller 3120 may control signal flow between blocks to perform an operation according to the flowchart described above. Specifically, the controller 3120 may control the communication unit to receive a nonlinearity state indicator from a transmitter, identify a nonlinearity compensation model for compensating nonlinearity of the transmission power of the signal transmitted from the transmitter, based on the nonlinearity state indicator, and control the communication unit to receive data from the transmitter, based on the nonlinearity compensation model corresponding to the nonlinearity state indicator.

The memory 3130 may store at least one of information transmitted and received through the communication unit 3110 and information generated through the controller 3120.

Through the disclosure, when the transmitter and the receiver use the NC model, the transmitter may transmit a signal by using a greater power, so the effect of increasing coverage may be expected. In addition, in using the NC model, the nonlinearity of the received signal may be effectively compensated for by selecting the NC model based on various situations of the transmitter. Through this, communication performance may be improved in terms of evaluation indicators of signals, such as EVM, ACLR, and SNR. In addition, processing load may be reduced by efficiently selecting and using a model without the need for the receiver to relearn the NC model each time.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first entity transmitting data in a wireless communication system, the method comprising:
   transmitting, to a second entity, a data set for learning nonlinearity compensation models;
   detecting a change in a nonlinearity of a transmission power of a signal transmitted from the first entity;
   identifying a periodicity with which the nonlinearity changes;
   based on a signaling type corresponding to the periodicity, transmitting, to the second entity, a nonlinearity state indicator for changing a nonlinearity compensation model to be applied in the second entity, the nonlinearity state indicator corresponding to the change in nonlinearity; and
   transmitting, to the second entity, data according to the nonlinearity state indicator.

2. The method of claim 1, further comprising:
   receiving, from the second entity, information on a number of the nonlinearity compensation models for the first entity supported by the second entity,
   wherein the nonlinearity state indicator is based on the number of the nonlinearity compensation models for the first entity supported by the second entity.

3. The method of claim 1,
   wherein the data set for learning the nonlinearity compensation models includes, for each nonlinearity state indicator, time domain in-phase and quadrature-phase (I/Q) input data and time domain I/Q output data.

4. The method of claim 1, further comprising:
   determining that at least one of the nonlinearity compensation models needs to be updated, based on an adjacent channel power ratio (ACPR) exceeding a threshold; and
   based on the determination, transmitting, to the second entity, a data set for updating the nonlinearity compensation models.

5. The method of claim 1,
   wherein the signaling type includes a radio resource control (RRC) message, a medium access control (MAC) control element (CE), or physical layer control information.

6. A method performed by a second entity receiving data in a wireless communication system, the method comprising:
   receiving, from a first entity, a data set for learning nonlinearity compensation models;
   learning, based on the data set, the nonlinearity compensation models for compensating a nonlinearity of a transmission power of a signal transmitted from the first entity;
   in case that the nonlinearity changes, receiving, from the first entity, a nonlinearity state indicator, wherein the nonlinearity state indicator is received based on a signaling type corresponding to a periodicity with which the nonlinearity changes;
   identifying a nonlinearity compensation model based on the nonlinearity state indicator; and
   receiving, from the first entity, data based on the nonlinearity compensation model corresponding to the nonlinearity state indicator.

7. The method of claim 6, further comprising:
   transmitting, to the first entity, information on a number of the nonlinearity compensation models for the first entity supported by the second entity,
   wherein the nonlinearity state indicator is based on the number of the nonlinearity compensation models for the first entity supported by the second entity.

8. The method of claim 6, wherein the data set for learning the nonlinearity compensation models includes, for each nonlinearity state indicator, time domain in-phase and quadrature-phase (I/Q) input data and time domain I/Q output data.

9. The method of claim 6, further comprising:
   in case that an adjacent channel power ratio (ACPR) in the first entity exceeds a threshold, receiving, from the first entity, a data set for updating the nonlinearity compensation models.

10. The method of claim 6,
    wherein the signaling type includes a radio resource control (RRC) message, a medium access control (MAC) control element (CE), or physical layer control information.

11. A first entity transmitting data in a wireless communication system, the first entity comprising:
    a transceiver; and
    a controller configured to:
      transmit, to a second entity via the transceiver, a data set for learning nonlinearity compensation models,
      detect a change in a nonlinearity of a transmission power of a signal transmitted from the first entity,
      identify a periodicity with which the nonlinearity changes,
      based on a signaling type corresponding to the periodicity, transmit, to the second entity via the transceiver, a nonlinearity state indicator for changing a nonlinearity compensation model to be applied in the second entity, the nonlinearity state indicator corresponding to the change in nonlinearity, and
      transmit, to the second entity via the transceiver, data according to the nonlinearity state indicator.

12. The first entity of claim 11,
wherein the controller is further configured to receive, from the second entity via the transceiver, information on a number of the nonlinearity compensation models for the first entity supported by the second entity, and
wherein the nonlinearity state indicator is based on the number of the nonlinearity compensation models for the first entity supported by the second entity.

13. The first entity of claim 11,
wherein the data set for learning the nonlinearity compensation models includes, for each nonlinearity state indicator, time domain in-phase and quadrature-phase (I/Q) input data and time domain I/Q output data.

14. The first entity of claim 11, wherein the controller is further configured to;
determine that at least one of the nonlinearity compensation models needs to be updated, based on an adjacent channel power ratio (ACPR) exceeding a threshold, and
based on the determination, transmit, to the second entity via the transceiver, a data set for updating the nonlinearity compensation models.

15. The first entity of claim 11,
wherein the signaling type includes a radio resource control (RRC) message, a medium access control (MAC) control element (CE), or physical layer control information.

16. A second entity receiving data in a wireless communication system, the second entity comprising:
a transceiver; and
a controller configured to:
receive, from a first entity via the transceiver, a data set for learning nonlinearity compensation models,
learn, based on the data set, the nonlinearity compensation models for compensating a nonlinearity of a transmission power of a signal transmitted from the first entity,
in case that the nonlinearity changes, receive, from the first entity via the transceiver, a nonlinearity state indicator, wherein the nonlinearity state indicator is received based on a signaling type corresponding to a periodicity with which the nonlinearity changes,
identify a nonlinearity compensation model based on the nonlinearity state indicator, and
receive, from the first entity via the transceiver, data based on the nonlinearity compensation model corresponding to the nonlinearity state indicator.

17. The second entity of claim 16,
wherein the controller is further configured to transmit, to the first entity via the transceiver, information on a number of the nonlinearity compensation models for the first entity supported by the second entity, and
wherein the nonlinearity state indicator is based on the number of the nonlinearity compensation models for the first entity supported by the second entity.

18. The second entity of claim 16, wherein the data set for learning the nonlinearity compensation models includes, for each nonlinearity state indicator, time domain in-phase and quadrature-phase (I/Q) input data and time domain I/Q output data.

19. The second entity of claim 16,
wherein the controller is further configured to:
in case that an adjacent channel power ratio (ACPR) in the first entity exceeds a threshold, receive, from the first entity via the transceiver, a data set for updating the nonlinearity compensation models.

20. The second entity of claim 16,
wherein the signaling type includes a radio resource control (RRC) message, a medium access control (MAC) control element (CE), or physical layer control information.

* * * * *